US012619285B2

(12) United States Patent　(10) Patent No.:　US 12,619,285 B2
Xu et al.　(45) Date of Patent:　May 5, 2026

(54) SUPPORT PLATE, FOLDABLE DISPLAY MODULE, AND FOLDABLE DISPLAY DEVICE

(71) Applicant: Hefei Visionox Technology Co., Ltd., Hefei (CN)

(72) Inventors: Gusheng Xu, Hefei (CN); Guizhou Qiao, Hefei (CN); Bo Yuan, Hefei (CN); Chang Lin, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 188 days.

(21) Appl. No.: 18/491,218

(22) Filed: Oct. 20, 2023

(65) Prior Publication Data

US 2024/0045477 A1　Feb. 8, 2024

Related U.S. Application Data

(63) Continuation of application No. PCT/CN2022/129556, filed on Nov. 3, 2022.

(30) Foreign Application Priority Data

Jan. 29, 2022　(CN) .......................... 202210111830.6

(51) Int. Cl.
*G06F 1/16*　(2006.01)
(52) U.S. Cl.
CPC .......... *G06F 1/1656* (2013.01); *G06F 1/1616* (2013.01); *G06F 1/1652* (2013.01)

(58) Field of Classification Search
CPC .... G06F 1/1656; G06F 1/1616; G06F 1/1652; G06F 1/1637; G06F 1/1641; G09F 9/301;
(Continued)

(56) References Cited

U.S. PATENT DOCUMENTS 10,694,625 B2 *　6/2020　Park ........................ G09F 9/301
10,838,457 B2 *　11/2020　Yu ........................ H04M 1/0268
(Continued)

FOREIGN PATENT DOCUMENTS

CN　110767096　A　2/2020
CN　110992828　A　4/2020
(Continued)

OTHER PUBLICATIONS

Decision to Grant issued on Aug. 1, 2024, in corresponding Chinese Application No. 202210111830.6, 7 pages.
(Continued)

*Primary Examiner* — Rockshana D Chowdhury
(74) *Attorney, Agent, or Firm* — Maier & Maier, PLLC

(57) ABSTRACT

A support plate, including at least one bendable area and a non-bendable area connected to the bendable area. The bendable area includes a first bendable zone and a second bendable zone located between the first bendable zone and the non-bendable area. The first bendable zone includes a first etching pattern, and the second bendable zone includes a second etching pattern. The flexural rigidity of the second bendable zone is greater than the flexural rigidity of the first bendable zone, and is less than the flexural rigidity of the non-bendable area. In the first bendable zone, the closer a region to the second bendable zone, the greater the flexural rigidity of the region.

17 Claims, 9 Drawing Sheets

(58) Field of Classification Search

CPC ................. H10K 59/87; H10K 77/111; H10K 2102/311; G02F 1/133305

See application file for complete search history.

(56) References Cited

U.S. PATENT DOCUMENTS

| | | | | |
|---|---|---|---|---|
| 10,866,618 | B2 * | 12/2020 | Yeom | G06F 1/1618 |
| 11,395,415 | B2 * | 7/2022 | Gu | G06F 1/1613 |
| 11,508,268 | B2 * | 11/2022 | Lee | G09F 9/301 |
| 11,513,560 | B2 * | 11/2022 | Dong | B32B 9/04 |
| 11,514,825 | B2 * | 11/2022 | Kim | G02B 1/118 |
| 11,546,986 | B2 * | 1/2023 | Wang | H05K 1/028 |
| 11,625,070 | B2 * | 4/2023 | Kang | H10K 59/8791 |
| | | | | 361/820 |
| 11,656,655 | B2 * | 5/2023 | Shin | G06F 1/1641 |
| | | | | 361/679.27 |
| 11,696,412 | B2 * | 7/2023 | Wu | G02F 1/133305 |
| | | | | 361/807 |
| 11,703,632 | B2 * | 7/2023 | Wen | G02B 6/0081 |
| | | | | 361/679.02 |
| 11,823,595 | B2 * | 11/2023 | Wang | G06F 1/1616 |
| 11,854,449 | B2 * | 12/2023 | Yeo | G09F 9/30 |
| 11,880,241 | B2 * | 1/2024 | Zhao | H04M 1/0268 |
| 11,908,349 | B2 * | 2/2024 | Zhao | G06F 1/1652 |
| 11,938,569 | B2 * | 3/2024 | Kwon | B23K 26/364 |
| 11,943,996 | B2 * | 3/2024 | Min | H10K 77/111 |
| 11,977,413 | B2 * | 5/2024 | Naito | G06F 1/1652 |
| 11,979,995 | B2 * | 5/2024 | Jiang | G06F 1/1637 |
| 12,041,738 | B2 * | 7/2024 | Nguyen | H04M 1/0268 |
| 12,142,632 | B2 * | 11/2024 | Nguyen | H10H 20/819 |
| 12,161,042 | B2 * | 12/2024 | Park | G09F 9/301 |
| 12,222,766 | B2 * | 2/2025 | Li | G06F 1/1681 |
| 12,232,408 | B2 * | 2/2025 | Park | G02F 1/1333 |
| 12,243,448 | B2 * | 3/2025 | Lee | G09F 9/301 |
| 12,259,756 | B2 * | 3/2025 | Zhou | G06F 1/1641 |
| 12,289,845 | B2 * | 4/2025 | Fu | H05K 5/0217 |
| 12,314,084 | B2 * | 5/2025 | Li | G06F 1/1656 |
| 2014/0300529 | A1 | 10/2014 | Kim et al. | |
| 2015/0049428 | A1 * | 2/2015 | Lee | G06F 1/1652 |
| | | | | 361/679.27 |
| 2016/0357052 | A1 * | 12/2016 | Kim | H10K 59/87 |
| 2017/0054106 | A1 * | 2/2017 | Jeon | H10K 59/873 |
| 2018/0175310 | A1 * | 6/2018 | Lee | B32B 27/283 |
| 2018/0190936 | A1 * | 7/2018 | Lee | B32B 15/04 |
| 2018/0192527 | A1 * | 7/2018 | Yun | G06F 1/1681 |
| 2019/0036068 | A1 * | 1/2019 | Kim | H05K 1/147 |
| 2019/0204867 | A1 * | 7/2019 | Song | G06F 1/1641 |
| 2020/0051881 | A1 * | 2/2020 | Park | B32B 27/06 |
| 2020/0313111 | A1 * | 10/2020 | Kim | H10K 59/87 |
| 2020/0319672 | A1 * | 10/2020 | Kim | G06F 1/1656 |
| 2021/0018962 | A1 | 1/2021 | de la Fuente | |
| 2021/0153363 | A1 * | 5/2021 | Cao | H10K 77/111 |
| 2021/0165454 | A1 * | 6/2021 | Dong | G06F 1/1652 |
| 2021/0360800 | A1 * | 11/2021 | Horiuchi | G06F 1/1641 |
| 2022/0206537 | A1 * | 6/2022 | Park | G06F 1/1641 |
| 2022/0236767 | A1 * | 7/2022 | Zhang | G06F 1/1681 |
| 2022/0343807 | A1 * | 10/2022 | Lee | G09F 9/301 |
| 2023/0018777 | A1 * | 1/2023 | Park | G06F 1/1656 |
| 2023/0161377 | A1 * | 5/2023 | Lee | G09F 9/301 |
| | | | | 361/679.01 |
| 2023/0354533 | A1 * | 11/2023 | Fu | H04M 1/0268 |
| 2023/0393626 | A1 * | 12/2023 | Kim | G06F 1/1652 |
| 2023/0409086 | A1 * | 12/2023 | Lin | G06F 1/1652 |
| 2024/0045477 | A1 * | 2/2024 | Xu | G06F 1/1641 |
| 2024/0081003 | A1 * | 3/2024 | Wang | H05K 5/0217 |
| 2024/0210989 | A1 * | 6/2024 | Son | G06F 1/1656 |
| 2025/0107023 | A1 * | 3/2025 | Wang | H05K 5/0217 |

FOREIGN PATENT DOCUMENTS

| | | | |
|---|---|---|---|
| CN | 211928943 | U | 11/2020 |
| CN | 112489564 | A | 3/2021 |
| CN | 112927625 | A | 6/2021 |
| CN | 112991953 | A | 6/2021 |
| CN | 113129752 | A | 7/2021 |
| CN | 113257123 | A | 8/2021 |
| CN | 214042900 | U | 8/2021 |
| CN | 113539094 | A | 10/2021 |
| CN | 113593417 | A | 11/2021 |
| CN | 114446170 | A | 5/2022 |
| EP | 4063996 | A1 | 9/2022 |
| IN | 202147060032 | A | 2/2023 |
| KR | 1020180079091 | A | 7/2018 |
| KR | 1020190049242 | A | 5/2019 |
| WO | 2021129407 | A1 | 7/2021 |

OTHER PUBLICATIONS

Office Action issued on Dec. 17, 2024, in corresponding Korean Application No. 10-2023-703-7608, 14 pages.

International Search Report Mailed on Jan. 16, 2023, in corresponding Chinese Application No. PCT/CN2022/129556, 6 pages.

Written Opinion issued on Jan. 16, 2023, in corresponding Chinese Application No. PCT/CN2022/129556, 8 pages.

The First Office Action issued on Apr. 27, 2023, in corresponding Chinese Application No. 202210111830.6, 32 pages.

* cited by examiner

4224

4222

4242

4242

4242

4242

SUPPORT PLATE, FOLDABLE DISPLAY MODULE, AND FOLDABLE DISPLAY DEVICE

CROSS-REFERENCE TO RELATED APPLICATIONS

This application is a continuation of international patent application No. PCT/CN2022/129556, filed on Nov. 3, 2022, which itself claims priority to Chinese patent application No. 202210111830.6, filed on Jan. 29, 2022, and titled "SUPPORT PLATE, FOLDABLE DISPLAY MODULE, AND FOLDABLE DISPLAY DEVICE", the content of which is hereby incorporated by reference in its entirety.

TECHNICAL FIELD

The present application relates to the field of display technology, and particularly to a support plate, a foldable display module and a foldable display device.

BACKGROUND

A foldable terminal device is one of the ongoing development trends in the field of terminal devices, as it not only can meet the users' demands for a large-sized screen, but can also avoid the problems of bulkiness and inconvenience to carry due to the large screen size. The foldable terminal device commonly includes a flexible display. Due to the pliable nature of the flexible display, the surface flatness of the flexible display is inadequate, resulting in the presence of waviness on the surface, which would affect the quality of the displayed images.

In the related art, in order to improve the surface flatness of the flexible display, one approach involves arranging a support plate on one side of the flexible display to support the flexible display. However, if the support plate is excessively thick, it would limit the bending of the flexible display; and if the support plate is excessively thin, its mechanical strength is not enough to effectively improve the surface flatness of the flexible display.

SUMMARY

In view of the above, there is a need to provide a support plate, a foldable display module, and a foldable display device.

One aspect of the present application is to provide a support plate. The support plate includes at least one bendable area and at least one non-bendable area connected to the bendable area. The bendable area includes a first bendable zone and a second bendable zone, the second bendable zone is located between the first bendable zone and the non-bendable area. The first bendable zone includes a first etching pattern, and the second bendable zone includes a second etching pattern, such that the flexural rigidity of the second bendable zone is greater than the flexural rigidity of the first bendable zone, and is less than the flexural rigidity of the non-bendable area. In the first bendable zone, the closer a region to the second bendable zone, the greater the flexural rigidity of the region.

In the above support plate, the flexural rigidities of the first bendable zone, the second bendable zone and the non-bendable area are decreasingly varied, and the flexural rigidity of the first bendable zone is regional and decreasingly varied, so that the bending ductility and fatigue resistance of the region corresponding to the support plate are improved, and the difference in curvature radius of each position of the support plate in the folded state is reduced, thereby allowing the bendable area to have a smooth transition and making the overall curvature of the bendable area more continuous. As such, it not only mitigate the bending stress concentration in the bendable area of the support plate, thereby reducing the risk of fracture or failure of the support plate, but also diminishes the stress exerted by the support plate on the flexible display panel, thereby protecting the flexible display panel from the risk of film debonding or cracking.

In an embodiment, the thickness of the support plate is ranged from 50 μm to 200 μm.

In an embodiment, the first etching pattern includes a plurality of first strip-shaped recesses, and the second etching pattern includes a plurality of second strip-shaped recesses. The depth of the first strip-shaped recess is larger than the depth of the second strip-shaped recess.

In an embodiment, the depth of the first strip-shaped recess is equal to the thickness of the support plate to form a hollow structure in the first bendable zone, and the depth of the second strip-shaped recess is less than the thickness of the support plate.

In an embodiment, the depth of the second strip-shaped recess is larger or equal to half of the thickness of the support plate, and is less than the thickness of the support plate.

In an embodiment, each of the bendable area is connected between two non-bendable areas, and a bending axis of the support plate is located in the first bendable zone. Taking the bending axis of the support plate as a reference, the first bendable zone includes a plurality of first sub-bendable zones continuously arranged along a first direction and located on the same side of the bending axis of the support plate. Each of the first sub-bendable zones comprises at least one row of first strip-shaped recesses extending along a second direction, and all of the first strip-shaped recesses in each of the first sub-bendable zones are equal in length. In the plurality of first sub-bendable zones located on the same side of the bending axis of the support plate, the closer the first sub-bendable zone to the second bendable zone, the less the length of the first strip-shaped recesses in the first sub-bendable zone. The first direction refers to a direction from the first bendable zone to the second bendable zone, and the second direction is parallel to the bending axis of the support plate and perpendicular to the first direction.

In an embodiment, the first bendable zone is an axisymmetric structure with the bending axis of the support plate as a symmetrical axis.

In an embodiment, a projection of each row of first strip-shaped recesses, projected along a thickness direction of the support plate, has a symmetrical axis along the second direction. A projection of the bending axis of the support plate, projected along the thickness direction of the support plate, coincides with the symmetrical axis along the second direction of the projection of one row of first strip-shaped recesses, projected along the thickness direction of the support plate.

In an embodiment, the row of first strip-shaped recesses corresponding to the bending axis of the support plate is located in one first sub-bendable zone, and the first strip-shaped recesses of the first sub-bendable zone have the largest length.

In an embodiment, in the plurality of first sub-bendable zones on the same side of the bending axis of the support plate, along the first direction, the lengths of the first strip-shaped recesses are decreased in accordance with a first preset pattern.

In an embodiment, the first preset pattern includes a fixed value, an arithmetic sequence, a second-order arithmetic sequence, or a geometric sequence.

In an embodiment, in the plurality of first sub-bendable zones on the same side of the bending axis of the support plate, along the first direction, the length of any one of the first strip-shaped recesses in the N-th first sub-bendable zone is $L_N$, and the length of any one of the first strip-shaped recesses in the (N+1)-th first sub-bendable zone is $L_{N+1}$, where N is a positive integer; and the first preset pattern is $L_N$-$L_{N+1}$=m, where m>0 and m is a constant.

In an embodiment, m is ranged from 0.05 mm to 0.5 mm.

In an embodiment, in the plurality of first sub-bendable zones on the same side of the bending axis of the support plate, along the first direction, the length of the first strip-shaped recesses in the 1-st first sub-bendable zones is $L_1$, and the length of any one of the first strip-shaped recesses in the N-th first sub-bendable zone is $L_N$, where N is a positive integer; and the first preset pattern is $L_N=L_1-(N-1)\times d_1$, where $d_1$>0.

In an embodiment, $d_1$ is ranged from 0.05 mm to 0.3 mm.

In an embodiment, in the plurality of first sub-bendable zones on the same side of the bending axis of the support plate, along the first direction, the length of the first strip-shaped recesses in the 1-st first sub-bendable zones is $L_1$, and the length of any one of the first strip-shaped recesses in the N-th first sub-bendable zone is $L_N$, where N is a positive integer; and the first preset pattern is $L_N=L_1+(N-1)\times b_1+(N-1)\times(N-2)\times d_2/2$, where $d_2=b_2-b_1$, $b_1=L_2-L_1$<0, and $b_2=L_3-L_2$<0.

In an embodiment, $d_2$ is ranged from 0.05 mm to 0.15 mm.

In an embodiment, in the plurality of first sub-bendable zones on the same side of the bending axis of the support plate, along the first direction, the length of the first strip-shaped recesses in the 1-st first sub-bendable zones is $L_1$, and the length of any one of the first strip-shaped recesses in the N-th first sub-bendable zone is $L_N$, where N is a positive integer; and the first preset pattern is $L_1=L_N\times q^{N-1}$, where q>0 and $L_1$>0.

In an embodiment, 1<q≤2.

In an embodiment, the first strip-shaped recesses in any two adjacent rows are staggered with each other along the first direction.

In an embodiment, a projection of each of the first strip-shaped recesses, projected along the thickness direction of the support plate, has a first symmetrical axis along the first direction. In the plurality of first sub-bendable zones on the same side of the bending axis of the support plate, the first symmetrical axes of the first strip-shaped recesses in row M coincide with the first symmetrical axes of the first strip-shaped recesses in row M+2, where M is a positive integer.

In an embodiment, the first strip-shaped recess in the extension direction includes a first recess section and second recess sections, and the second recess sections are located at two ends of the first recess section. Each of the first recess section and the second recess sections is an equal-width structure, and the width of the second recess sections is larger than the width of the first recess section.

In an embodiment, the first recess section is provided with a transition section in a middle position thereof, and a side wall of the first strip-shaped recess in the transition section protrudes outwardly, such that the width of the first strip-shaped recess in the transition section is larger than the width of the first recess section.

In an embodiment, a projection of a side wall of the transition section of any one of the first strip-shaped recesses, projected along the thickness direction of the support plate, is symmetrical with respect to the first symmetrical axis of the first strip-shaped recess.

In an embodiment, in the same first sub-bendable zone, an equal first spacing is defined between any two adjacent first strip-shaped recesses in one row. In the plurality of first sub-bendable zones on the same side of the bending axis of the support plate, the first spacing is increased gradually along the first direction.

In an embodiment, the support plate includes a third side and a fourth side. The third side and the fourth side are perpendicular to the bending axis of the support plate. At least some of the plurality of the first sub-bendable zones on the same side of the bending axis of the support plate include a marginal strip-shaped recess, and each of the marginal strip-shaped recesses is arranged in a row with corresponding first strip-shaped recesses, having one end running through the third side or the fourth side. The spacing between the marginal strip-shaped recess and one adjacent first strip-shaped recess in the same row is equal to the first spacing between any two adjacent first strip-shaped recesses in the same row.

In an embodiment, along the first direction, all of the first strip-shaped recesses are equal in width; and/or a second spacing between the first strip-shaped recesses in any two adjacent rows is equal.

In an embodiment, in the second bendable zone, the closer a region to the non-bendable area, the greater the flexural rigidity of the region.

In an embodiment, the second bendable zone includes a plurality of second sub-bendable zones continuously arranged along the first direction, each of the second sub-bendable zones includes at least one row of the second strip-shaped recesses extending along the second direction, and all of the second strip-shaped recesses in each of the second sub-bendable zones are equal in length. The closer the second sub-bendable zone to the non-bendable area, the less the length of the second strip-shaped recesses in the second sub-bendable zone.

In an embodiment, in the plurality of second sub-bendable zones, along the first direction, the lengths of the second strip-shaped recesses are decreased in accordance with a second preset pattern.

In an embodiment, the second bendable zone includes a plurality of second sub-bendable zones continuously arranged along the first direction. Each of the second sub-bendable zones includes a the second strip-shaped recess extending along the second direction. The support plate includes a third side and a fourth side, the third side and the fourth side are perpendicular to the bending axis of the support plate, and the second strip-shaped recess run through the third side and the fourth side of the support plate.

Another aspect of the present application is to provide a foldable display module. The foldable display module includes a flexible display panel and the support plate as described in any one of the above embodiments. The support plate includes a first side and a second side opposite to each other. The first etching pattern and the second etching pattern are disposed on the second side of the support plate, and the flexible display panel is disposed on the first side of the support plate.

Yet another aspect of the present application is to provide a foldable display device. The foldable display device includes the foldable display module as described in any one of the above embodiments.

DETAILED DESCRIPTION

A portable display device, such as a communication terminal, a game console, a multimedia player, a portable computer, or a portable imaging device, typically includes a display screen capable of displaying images. Some of these display devices have a foldable structure. For example, one display device may have two housings that can be folded with respect to each other, and each housing is provided with one display screen. While this approach achieves foldability, it could not provide a seamless large-screen display.

Figure 1:
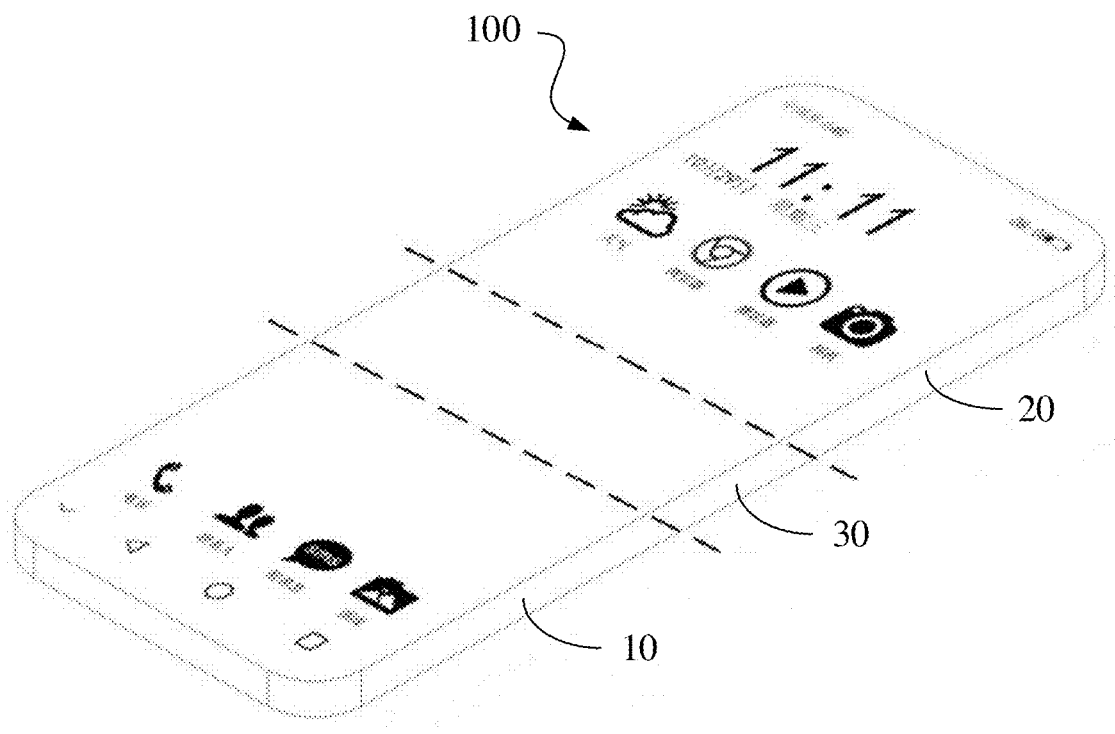
FIG. 1 shows a structural schematic view of a foldable display device in an unfolded state in an embodiment of the present application.
Figure 2:
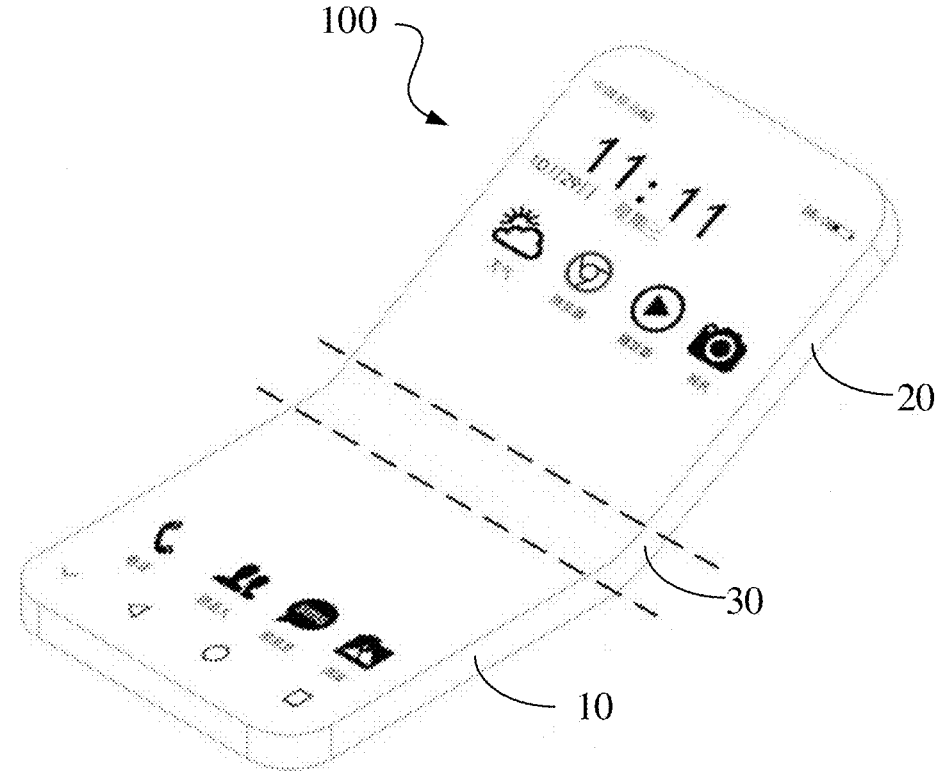
FIG. 2 shows a structural schematic view of the foldable display device of FIG. 1 in a folded state.

With the development of the flexible display technology, a flexible display screen has been applied to the display device with the foldable structure. In this case, the flexible display screen can be arranged on the two housings and across a connecting unit between the two housings. For example, an inward foldable screen device is shown in FIGS. 1 and 2. The inward foldable screen device involves that the body of the electronic device is capable of folding towards the display screen, and the display screen is hidden at the inner side of the body of the electronic device when the body of the electronic device is folded. As such, the display screen is concealed when the body is in a folded state, and exhibits a normal flat screen effect when the body is in an unfolded state. In contrast, an outward foldable screen device entails the body of the electronic device being capable of folding towards the back side of the body, and the display screen can surround the external surface of the body of the electronic device when the body of the electronic device is folded. As such, the display screen can envelop the body when the body is in a folded state to form a surrounding screen, and can exhibit a normal flat screen effect when the body is in an unfolded state.

In some display devices, in order to ensure the flatness of the flexible display screen, support is only provided to the non-bendable part of the flexible display screen. Due to the limited strength and stiffness inherent to the flexible display screen, the bendable part is prone to developing wrinkles. Moreover, while the bendable part of the flexible display screen is pressed by a user or subjected to a force caused by the user holding the display device, the bendable part of the flexible display screen is prone to collapse due to lack of support, ultimately resulting in damage. In some other display devices, a support structure is disposed on the back of the flexible display screen, offering a degree of support. For example, a stainless-steel plate (SUS) can be used as the support structure of the flexible display screen. However, if the stiffness of the support structure is too great, the bending of the flexible display screen would be limited, and the support structure would be prone to cracking under repeated bending. If the stiffness of the support structure is too small, the flatness of the flexible display screen could not be effectively improved.

In addition, given the obvious difference in elastic modulus between a one piece stainless-steel plate and the film layers and the optical clear adhesive (OCA) layer in the flexible display screen, the stainless-steel plate tends to resist deformation during bending, especially in the bending area. Therefore, there is usually inconsistent deformation by force in the film layers during the folding, resulting in instances of debonding or cracking between the film layers.

An embodiment of the present application provides a support plate, which is capable of effectively support a flexible display panel, so that the flexible display panel can have a good flatness and impact resistance while not imposing limitations on its bending actions. Moreover, the support plate itself would not be prone to cracking, thereby improving the reliability of a foldable display device.

The foldable display device can be a mobile phone, including the flexible display panel with display function or with both display and touch-control functions. The flexible display panel can be, for example, a flexible organic light-emitting diode (OLED) display panel, a flexible liquid crystal display (LCD) panel, or other types of flexible display panels. When the mobile phone is in a folded state, the space occupied by the mobile phone can be relatively small, facilitating convenient storage and portability of the mobile phone. When the mobile phone is in an unfolded state, the mobile phone can have a large display area, and thus it is convenient for a user to operate and read on the mobile phone.

In another example, the foldable display device can be a tablet computer. When the tablet computer is in a folded state, if the tablet computer is bent towards the display surface, one part of the tablet computer can be placed horizontally and configured to display the keyboard, thus forming a workspace for office tasks, and the other part is tilted and configured to display images or text, thus forming an office display area. In this way, it would be convenient for a user to engage in the mobile office tasks or games. In another example, the foldable display device can be an E-book reader, allowing for a more authentic book-like experience through its bending capability, which mimics the act of turning pages. In yet another example, the foldable display device can be a notebook computer, in which the flexible display panel can be extended to the keyboard area to expand the display area. In addition, the foldable display device can also be applied to bionic electronics, electronic skins, wearable devices, vehicle-mounted devices, Internet of Things devices, artificial intelligence devices, and other fields, as well as a variety of application scenarios involving bending or folding, which will not be detailed herein.

The flatness of a flexible display panel refers to the degree of surface flatness when the bendable part of the foldable display device is not bent, and refers to the degree of surface smoothness when the bendable part is bent. Here, smooth means that the bendable part has no or only few textures or unevenness on the surface of the bendable part when the bendable part is bent. When the bendable part is bent, the less the surface textures or unevenness of the bendable part, the higher the degree of surface smoothness of the bendable part, and the higher the degree of surface flatness of the bendable part.

Flexural rigidity, also known as bending stiffness of a section, refers to the bending moment required to be applied for producing unit curvature of the section, which reflects the ability of the section to resist bending deformation. That is, a higher flexural rigidity means that the part is less prone to bending, while a lower flexural rigidity means that the part is more prone to bending.

As shown in FIGS. 1 and 2, in an embodiment of the present application, a foldable display device 100 includes a first part 10, a second part 20, and a bendable part 30 located between the first part 10 and the second part 20. The bendable part 30 can be deformed, so that the first part 10 is unfolded (as shown in FIG. 1) or folded (as shown in FIG. 2) relative to the second part 20.

The foldable display device 100 includes a foldable display module and a foldable assembly. The foldable assembly includes a first body, a second body, and a connecting unit. The connecting unit is connected between the first body and the second body, so that the first body can rotate around a bending axis relative to the second body. The foldable display module is supported by the first body and the second body, thereby being unfolded or folded during the rotating of the first body and the second body. Specifically, in some embodiments, the connecting unit can include a hinge, through which the first body and the second body can be rotated relative to each other. As shown in FIGS. 1 and 2, in some embodiments, the length direction of the foldable display device 100 is perpendicular to the bending axis of the foldable display device, and the width direction of the foldable display device 100 is parallel to the bending axis of the foldable display device. The embodiments below will be described on the basis that the bending axis is parallel to the width direction of the foldable display device 100. It can be understood that the bending axis is not limited to along that direction. For example, in other embodiments, the bending axis can extend parallel to the length direction or the diagonal direction of the foldable display device 100, or along other directions.

Figure 3:
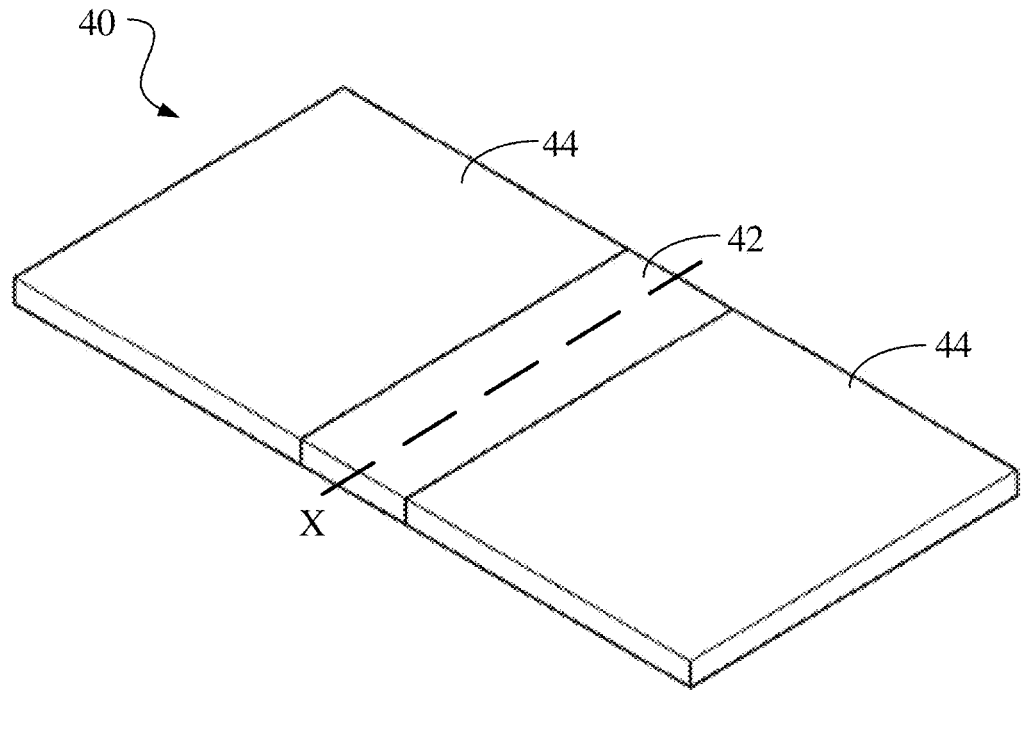
FIG. 3 shows a structural schematic view of a support plate in an unfolded state in an embodiment of the present application.
Figure 4:
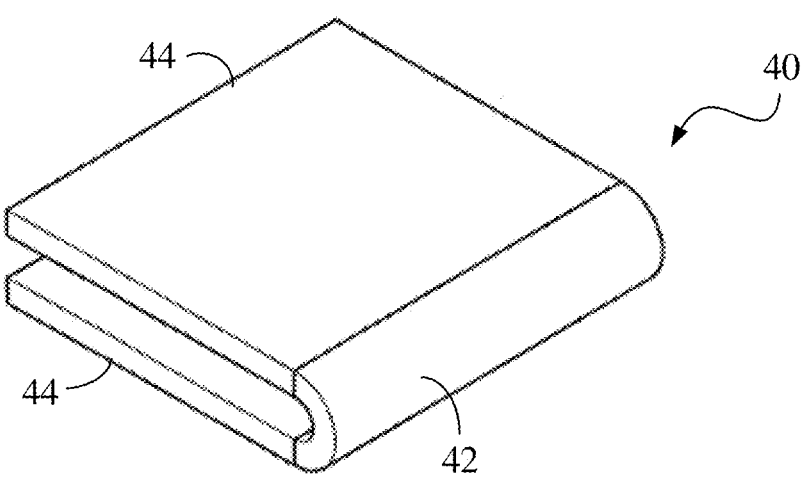
FIG. 4 shows a structural schematic view of the support plate of FIG. 3 in a folded state.

As shown in FIGS. 3 and 4, the foldable display module includes a flexible display panel and a support plate 40. The support plate 40 is configured to support the flexible display panel. Specifically, the flexible display panel includes a first display area, a bendable display area, and a second display area. In an embodiment, the foldable display device 100 can be folded inwardly. That is, in this folded state, the first display area and the second display area of the flexible display panel are face-to-face with each other. In this state, the first display area, the second display area, and the bendable display area can be in an inactive state. In another embodiment, the foldable display 100 can be folded outwardly. That is, in this folded state, the first display area and the second display area of the flexible display panel are back-to-back with each other, so that size of the display device can be reduced in its length direction for easy storage or carrying. In this state, at least one of the first display area, the second display area, or the bendable display area can be in an active state.

The support plate 40 includes a first side and a second side opposite to each other, and the flexible display panel is disposed on the first side of the support plate 40. The side of the flexible display panel that is in contact with the first side of the support panel 40 is the back side, so that the support panel 40 can effectively support the flexible display panel while not obstructing the images displayed by the flexible display panel.

It can be understood that, as mentioned above, the foldable display module is often used in application scenarios involving bending. Therefore, the support plate 40 is required to have a balance of plasticity and rigidity, so that the foldable display module can maintain a stable support state in various unfolded and folded states. The material of the support plate 40 can be metal or alloy, such as type 301 stainless steel, type 304 stainless steel, type 316L stainless steel, as well as copper-nickel-tin alloy, titanium alloy, or high-strength magnesium-aluminum alloy, etc. Of course, the material of the support plate 40 can also be glass, organic polymer, etc., which is not limited here. The thickness of the support plate 40 can be selected as needs. As an optional embodiment, the thickness of the support plate 40 can be ranged from 50 μm to 200 μm. For example, the thickness of the support plate 40 can be 50 μm, 60 μm, 70 μm, 80 μm, 90 μm, 100 μm, 125 μm, 150 μm, 175 μm or 200 μm, etc. In this way, the support plate 40 can have satisfied stiffness, so as to effectively support the flexible display panel.

The support plate 40 includes at least one bendable area 42 and at least one non-bendable area 44 connected to the bendable area 42. The bendable area 42 refers to the area of the support plate 40 that is bent when the foldable display module is folded, and the non-bendable area 44 refers to the area of the support plate 40 that is not be bent when the foldable display module is folded. As an optional embodiment, the non-bendable area 44 can be a flat area to correspondingly support the first display area and the second display area of the flexible display panel, and the bendable area 42 can correspondingly support the bendable display area of the flexible display panel. As shown in FIG. 3, when the foldable display module is in a non-bending state, the bendable area 42 and the non-bendable area 44 can form a flat support, which facilitates flat display of the flexible display panel. When the foldable display module is in a bending state, as shown in FIG. 4, the bendable area 42 of the support plate 40 can be bent. At this time, the non-bendable area 44 can support the first display area and the second display area of the flexible display panel, and the bendable area 42 can support the bendable display area of the flexible display panel, providing flatness of the bendable display area of the flexible display panel during the bending, while ensuring unrestricted bending movement of the flexible display panel, so as to achieve good display while bending.

It shall be noted that the number of the bendable areas 42 can be determined by the number of folds of the foldable display module. If the foldable display module is to be folded only once, i.e., with a single fold, then the support plate 40 can include one bendable area 42. If the foldable display module is to be folded twice, i.e., with double folds, then the support plate 40 can include two bendable areas 42.

Figure 5:
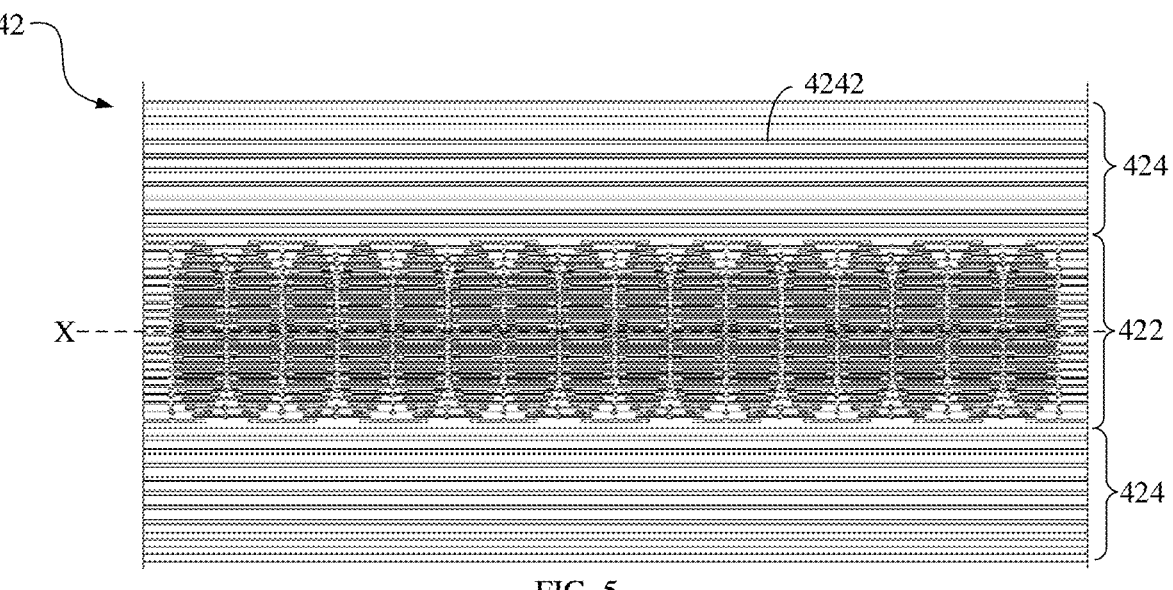
FIG. 5 shows a structural schematic view of a bendable area of a support plate in an embodiment of the present application.

As shown in FIG. 5, in an embodiment of the present application, the bendable area 42 includes a first bendable zone 422 and a second bendable zone 424 located between the first bendable zone 422 and the non-bendable zone 44. The first bendable zone 422 is provided with a first etching pattern and the second bendable zone 424 is provided with a second etching pattern. Specifically, the first etching pattern and the second etching pattern are formed on the second side of the support plate 40, and the flexible display panel is disposed on the first side of the support plate 40.

The flexural rigidity of the second bendable zone 424 is greater than that of the first bendable zone 422, and is less than that of the non-bendable area 44. In the first bendable zone 422, the closer a region to the second bendable zone 424, the greater the flexural rigidity of the region. It shall be noted that the flexural rigidity reflects the ability of a plane to resist bending deformation. Therefore, a higher flexural rigidity means that a part is less susceptible to bending, and a lower bending strength means that the part is more susceptible to bending. In an embodiment of the present application, the first bendable zone 422 and the second bendable zone 424 are provided with different etching patterns, so that the flexural rigidity of the second bendable zone 424 is greater than that of the first bendable zone 422, and in the first bendable zone 422, the closer a region to the second bendable zone 424, the greater the flexural rigidity of the region. In this way, on the one hand, the flexural rigidities of the first bendable zone 422, the second bendable zone 424 and the non-bendable area 44 are regional and increasingly varied. As such, the bending ductility and fatigue resistance of different areas of the support plate 40 are improved, and the difference in the curvature radius between bendable zones of the support plate 40 in the folded state is reduced, thereby allowing the bendable area 42 to have a smooth transition and making the overall curvature of the bendable area 42 more continuous. Thus, not only the bending stress concentration of the support plate 40 is mitigated, thereby reducing the risk of fracture or failure of the support plate 40, the stress exerted by the support plate 40 on the flexible display panel also diminishes, thereby protecting the flexible display panel from the risk of film debonding or cracking.

Figure 6:
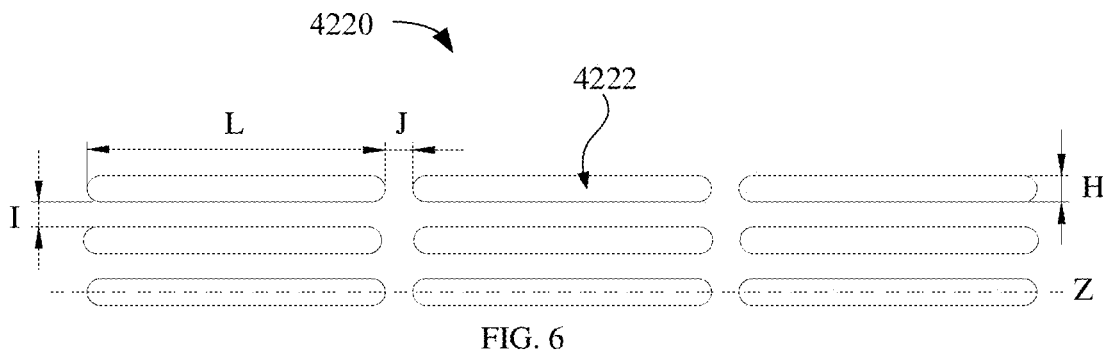
FIG. 6 shows a schematic view of an arrangement of first strip-shaped recesses in a first sub-bendable zone of a first bendable zone in an embodiment of the present application.
Figure 7:
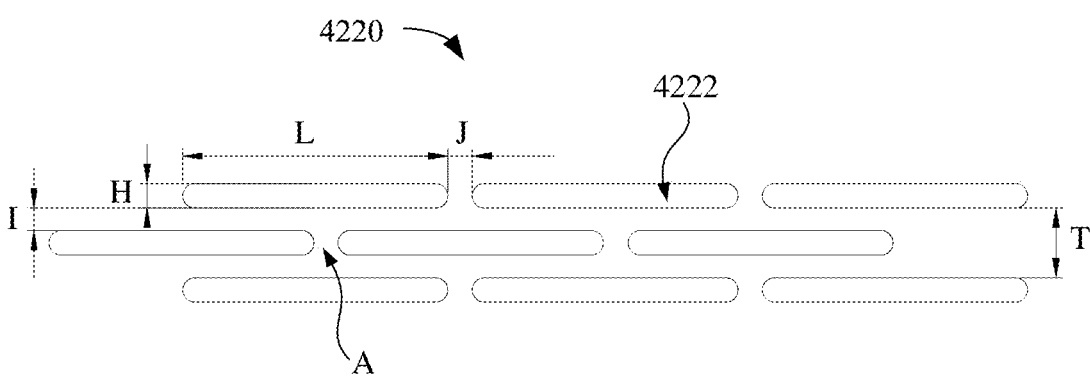
FIG. 7 shows a schematic view of an arrangement of first strip-shaped recesses in a first sub-bendable zone of a first bendable zone in another embodiment of the present application.

In order to achieve the above embodiments, as shown in FIGS. 5 to 7, the first etching pattern can include a plurality of first strip-shaped recesses 4222, and the second etching pattern can include a plurality of second strip-shaped recesses 4242. The depth of the first strip-shaped recesses 4222 is greater than that of the second strip-shaped recesses 4242. It can be understood that the structure of the strip-shaped recesses formed by etching on the support plate 40 can not only reduce the stiffness of the corresponding area of the support plate 40, but also reduce the stress concentration coefficient of the corresponding area of the support plate 40. When the depth of the first strip-shaped recess 4222 is greater than that of the second strip-shaped recess 4242, the flexural rigidity of the first bendable zone 422 is less than that of the second bendable zone 424. In this way, the bending ductility and fatigue resistance of different areas of the support plate 40 are improved, and the difference in curvature radius between bendable areas of the support plate 40 in the folded state is reduced, thereby making the transition of the bendable area 42 relatively smooth.

In an embodiment, the depth of each first strip-shaped recess 4222 is equal to the thickness of the support plate 40, thereby forming a hollow structure in the first bendable zone 422. In this way, the support plate 40 can be provided with more deformation space in the first bendable zone 422 to reduce the internal stress generated by deformation of the first bendable zone 422 of the support plate 40 and improve the bending performance of the first bendable zone 422. The depth of each second strip-shaped recess 4242 can be less than the thickness of the support plate 40. That is, the second strip-shaped recess 4242 does not fully penetrate through the support plate 40, so that the support plate 40 still can have a bottom with a certain thickness at the second bendable zone 424, maintaining a continuous structural integrity. For example, the depth of the second strip-shaped recess 4242 is greater than or equal to half of the thickness of the support plate 40 and is less than the thickness of the support plate 40.

In order to further understand the technical solutions of the present application, some technical terms are described below.

Length L and width H of a first strip-shaped recess 4222: As shown in FIGS. 6 and 7, each first strip-shaped recess 4222 is a long strip, the length L of the first strip-shaped recess 4222 refers to the dimension along the extension direction of the first strip-shaped recess 4222, and the width H of the first strip-shaped recess 4222 refers to the dimension along the direction perpendicular to the extension direction of the first strip-shaped recess 4222.

First spacing J of two adjacent first strip-shaped recesses 4222 in the same row: As shown in FIGS. 6 and 7, the first spacing J of the two adjacent first strip-shaped recesses 4222 in the same row refers to the spacing between two adjacent ends of the two adjacent first strip-shaped recesses 4222.

Aperture ratio of first strip-shaped recesses 4222 refers to the area proportion of the first strip-shaped recesses 4222 occupied in the first sub-bendable zone 4220. The greater the area proportion of the first strip-shaped recesses 4222 in the first sub-bendable zone 4220, the greater the aperture ratio of the first strip-shaped recesses 4222, and vice versa.

As shown in FIGS. 5 to 8, in some embodiments of the present application, each bendable area 42 is connected between two non-bendable areas 44, and the bending axis X of the support plate 40 is located in the first bendable zone 422. Taking the bending axis X of the support plate 40 as a reference, the first bendable zone 422 includes a plurality of first sub-bendable zones 4220 continuously arranged along a first direction and located on the same side of the bending axis X of the support plate 40. Each first sub-bendable zone 4220 includes at least one row of first strip-shaped recesses 4222 extending along a second direction. All of the first strip-shaped recesses 4222 in each of the first sub-bendable zones 4220 are equal in length L. The first direction refers to the direction from the first bendable zone 422 to the second bendable zone 424. The second direction is parallel to the bending axis X of the support plate 40 and perpendicular to the first direction. In an embodiment, the first bendable zone 422 is an axisymmetric structure with the bending axis X of the support plate 40 as its symmetrical axis. In this way, the two second bendable zones 424 and the two symmetrical portions of the first bendable zone 422 can be symmetrically folded or unfolded around the bending axis X of the support plate 40, thereby further avoiding stress concentration.

Figure 8:
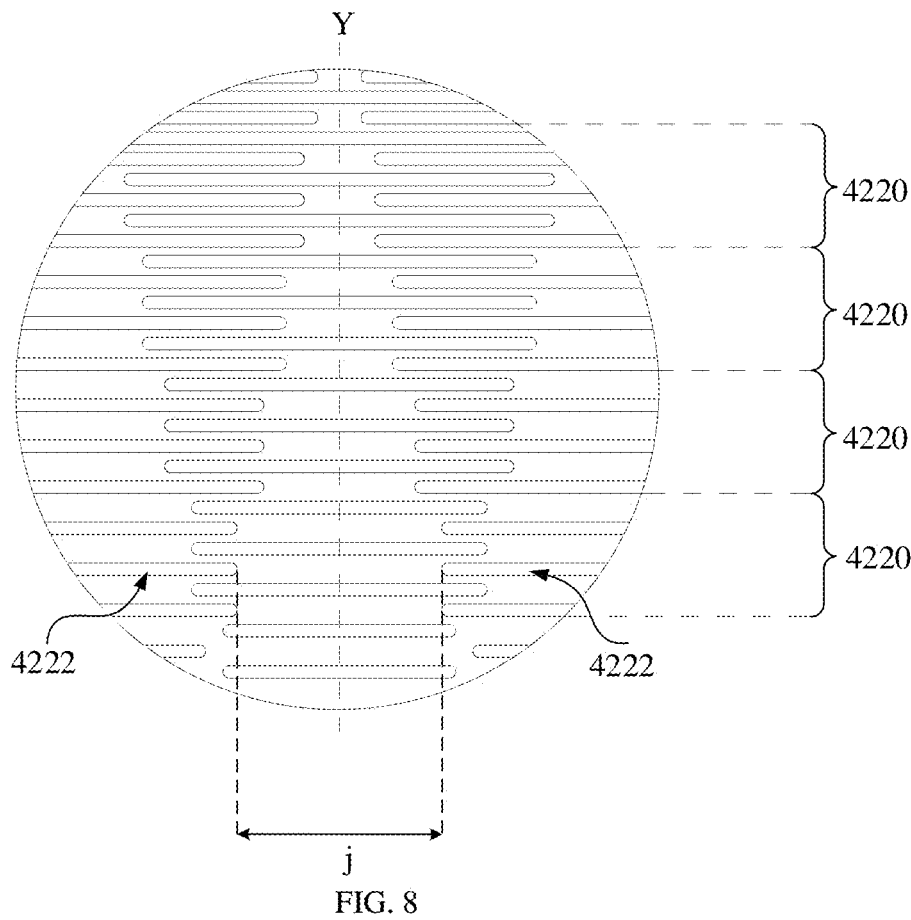
FIG. 8 shows a structural schematic view of a local area of a first bendable zone in an embodiment of the present application.

In some embodiments, as shown in FIGS. 6 to 8, the projection of each of the first strip-shaped recesses 4222, projected along the thickness direction of the support plate 40, has a first symmetrical axis Y along the first direction. In the second direction, a plurality of first strip-shaped recesses 4222 are arranged side by side, which form a row. The projection of the plurality of first strip-shaped recesses 4222 in each row, projected along the thickness direction of the support plate 40, has a symmetrical axis Z along the second direction. As an optional embodiment, the projection of the bending axis X of the support plate 40 on the plane where the support plate 40 is located coincides with the symmetrical axis Z along the second direction of the projection of one row of first strip-shaped recesses 4222 along the thickness direction of the support plate 40. In this way, the bending performance of the support plate 40 is further improved.

It can be understood that each of the first sub-bendable zones 4220 can include one row of first strip-shaped recesses 4222, or a plurality of rows of first strip-shaped recesses 4222, which is not limited herein. For example, in the embodiment shown in FIG. 6, the first sub-bendable zones 4220 can include a plurality of rows of first strip-shaped recesses 4222, and the first strip-shaped recesses 4222 have an equal length L.

It can also be understood that, the number of the rows of first strip-shaped recesses 4222 in the plurality of first sub-bendable zones 4220 continuously arranged along the first direction can be exactly the same, for example, as shown in FIG. 8. In some embodiments, each of the first sub-bendable zones 4220 can include a plurality of rows of first strip-shaped recesses 4222, and the first strip-shaped recesses 4222 have an equal length L. Of course, the plurality of first sub-bendable zones 4220 can include different numbers of rows of first strip-shaped recesses 4222, which is not limited herein.

In some embodiments, in the plurality of first sub-bendable zones 4220 located on the same side of the bending axis X of the support plate 40, the closer the first sub-bendable zone 4220 to the second bendable zone 424, the less the length L of the first strip-shaped recesses 4222 therein. It can be understood that the greater the aperture ratio of the first strip-shaped recesses 4222 in the first sub-bendable zone 4220, the less the flexural rigidity of the support plate 40 in the first sub-bendable zones 4220. Therefore, the length and width of the first strip-shaped recesses 4222 in each of the first sub-bendable zones 4220, and the first spacing J between the adjacent first strip-shaped recesses 4222 in the same row in each of the first sub-bendable zones 4220 can determine the aperture ratio of the first strip-shaped recesses in the first sub-bendable zone 4220, and thus also determine the flexural rigidity of the first sub-bendable zone 4220.

In some embodiments, the width of the support plate 40 is a fixed value, and thus on the premise that the width of the first strip-shaped recesses 4222 is equal, and that the first spacing J between adjacent first strip-shaped recesses 4222 is also equal, the closer the first sub-bendable zone 4220 to the second bendable zone 424, the smaller the length L of the first strip-shaped recesses 4222 in that first sub-bendable zone 4220, which means that the smaller the aperture ratio of the first strip-shaped recesses arranged in that first sub-bendable zones 4220. As such, the closer the region in the first bendable zone 422 to the second bendable zone 424, the greater the flexural rigidity of that region. Thus, the flexural rigidity of the plurality of the first sub-bendable zones 4220 can have a smooth variation.

As an optional embodiment, the row of first strip-shaped recesses 4222 corresponding to the bending axis X of the support plate 40 is located in one first sub-bendable zone 4220, and the first strip-shaped recesses 4222 in this first sub-bendable zone 4220 have the largest length. On the premise that the width of the first strip-shaped recesses 4222 is equal, and that the first spacing J between adjacent first strip-shaped recesses 4222 is also equal, the first sub-bendable zone 4220, where the row of first strip-shaped recesses 4222 corresponding to the bending axis X of the support plate 40 is located, has the smallest flexural rigidity. This approach further improves the bending performance of the support plate 40, effectively preventing fracture of the support plate 40 along its bending axis X.

It can be understood that, in order to more precisely control the smooth transition of the flexural rigidity in different regions of the support plate 40, in some embodiments, in the same first sub-bendable zone 4220, the first spacing J between any two adjacent first strip-shaped recesses 4222 in the same row is equal, and along the first direction, the first spacings J in the plurality of the first sub-bendable zones 4220 on the same side of the bending axis X of the support plate 40 are gradually increased. In this way, the aperture ratios of the first strip-shaped recesses 4222 exhibit a smooth transition in the first sub-bendable zones 4220 along the direction toward the second bendable zone 424, so that the flexural rigidities of the first sub-bendable zones 424 exhibit a smooth transition along the direction toward the second bendable zone 424. As such, the bending ductility and fatigue resistance of the corresponding region of the support plate 40 can be improved, and the difference in the curvature radius between bendable zones of the support plate 40 in the fully folded state is reduced, allowing the bendable area 42 to have a smooth transition.

As shown in FIG. 6, the first strip-shaped recesses 4222 in two adjacent rows are flush with each other. In this case, the larger the aperture ratio of the first strip-shaped recesses 4222, the stronger the bending resistance of the support plate 40. However, the width I of the connecting portion between the first strip-shaped recesses 4222 in the two adjacent rows is relatively small, and the bendable area 42 is more prone to fracture during the process of bending. In some embodiments, as shown in FIG. 7, the first strip-shaped recesses 4222 in the two adjacent rows are staggered with each other, so that the projections of adjacent first strip-shaped recesses 4222 in two adjacent rows, on the lateral side of the support plate 40 along the first direction, has an overlapping region. That is, on the lateral side of the support plate 40 along the first direction, the projection of a connecting bridge A between two adjacent first strip-shaped recesses 4222 in the same row is overlapped with the projection of one first strip-shaped recess 4222 in the adjacent row. In this way, as compared with that the first strip-shaped recesses 4222 in two adjacent rows are flush with each other as shown in FIG. 6, the strength of the connecting portion between adjacent first strip-shaped recesses 4222 in two adjacent rows is enhanced by the connecting bridge A, thus achieving a balance between providing sufficient bending resistance and preventing fracture.

It can be understood that when the support plate 40 has a fixed width, in different first sub-bendable zones 4220 along the first direction, the length L of the first strip-shaped recesses 4222 is gradually decreased, and the first spacing J is gradually increased. Correspondingly, the stagger degree of the adjacent first strip-shaped recesses 4222 in the two adjacent rows in different first sub-bendable zones 4220 is also gradually increased. In this way, the strength of the connecting portion between the first strip-shaped recesses 4222 in the two adjacent rows in different first sub-bendable zones 4220 is also increased, and the flexural rigidity of the corresponding first sub-bending zones 4220 is gradually increased. It shall be noted that the overlapped length of the overlapping regions along the extension direction of the first strip-shaped recesses 4222 can be a positive value or reduced to be a negative value. That is, as shown in FIG. 8, in different first sub-bendable zones 4220, the two adjacent first strip-shaped recesses 4222 in two adjacent rows that are relatively close to the second bendable zone 424 can be completely non-overlapped.

Figure 9:
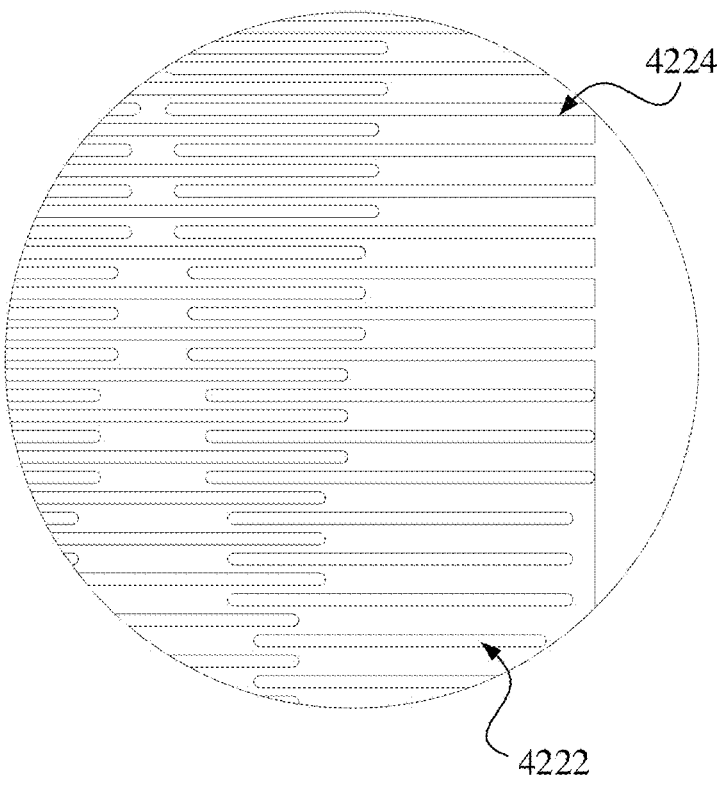
FIG. 9 shows a structural schematic view of another local area of the first bendable zone of FIG. 8.

The support plate 40 can further include a third side and a fourth side. The third side and the fourth side are perpendicular to the bending axis X of the support plate 40, and the third side and the fourth side are connected between the first side and the second side, respectively. In some embodiments, as shown in FIG. 9, at least some first sub-bendable zones 4220 on the same side of the bending axis X of the support plate 40 include a marginal strip-shaped recess 4224. Each marginal strip-shaped recess 4224 is arranged in the same row with corresponding first strip-shaped recesses 4222, having one end running through the third side or the fourth side. The spacing between the marginal strip-shaped recess 4224 and an adjacent first strip-shaped recess 4222 in the same row is equal to the first spacing J between any two adjacent first strip-shaped recesses 4222 in the same row. In this way, on the one hand, the first strip-shaped recesses are more regularly arranged; on the other hand, the stress of the marginal regions of the support plate 40 adjacent to the sides perpendicular to the bending axis X can be reduced, and the bending resistance of the support plate 40 can be further improved.

In some embodiments, in the first direction, the second spacing I between the first strip-shaped recesses 4222 can be equal in any two adjacent rows. That is, the connecting portions between the first strip-shaped recesses 4222 in any two rows are equal in width along the first direction. As such, the flexural rigidity of different first bendable zones 4220 can be precisely controlled by controlling the length and width of the first strip-shaped recesses 4222 in different rows, and controlling the first spacing J between two adjacent first strip-shaped recesses 4222 in the same row in different first sub-bendable zones 4220.

In some embodiments, as shown in FIG. 8, the projection of each of the first strip-shaped recesses 4222, projected along the thickness direction of the support plate 40, has a first symmetrical axis Y along the first direction. In the plurality of first sub-bendable zones 4220 on the same side of the bending axis X of the support plate 40, the first symmetrical axes Y of the first strip-shaped recesses 4222 in row M coincide with the first symmetrical axes Y of the first strip-shaped recesses 4222 in row M+2, where M is a positive integer. In this way, the stagger arrangement of the plurality of rows of first strip-shaped recesses 4222 are more regular, which facilitates precise control of the smooth transition in the plurality of the first sub-bendable zones 4220 of the support plate 40 along the first direction.

In some embodiments, the row of first strip-shaped recesses 4222 corresponding to the bending axis X of the support plate 40 can be the first row of first strip-shaped recesses 4222 in the plurality of first sub-bendable zones 4220 on the same side of the bending axis X of the support plate 40, i.e., the row M where M=1.

In some embodiments, as shown in FIGS. 10 to 13, the first strip-shaped recesses 4222 have different widths at different positions in their extension direction, and the second strip-shaped recesses 4242 (see FIGS. 14 to 18) have a consistent width across various positions in their extension direction. Specifically, in the embodiment shown in FIG. 10, each first strip-shaped recess 4222 in its extension direction includes a first recess section 4221 and second recess sections 4223 located at two ends of the first recess section 4221. The first recess section 4221 and the second recess sections 4223 are all equal-width structures, and the width of the second recess sections 4223 is greater than that of the first recess section 4221. In this way, the first strip-shaped recess 4222 as a whole can be a dumbbell-shaped structure, broader at the ends and narrower in the middle. The second recess sections 4223 with the greater width can form a rounded corner transition with a larger radius at the two ends of the first strip-shaped recess 4222, which facilitates reduction of stress concentration during the bending. Since the function of the second recess sections 4223 is to form a rounded corner transition with a larger radius at the two ends of the first strip-shaped recess 4222, the second recess sections 4223 are not required to be too long.

There is a width variation at the connecting portions between the first recess section 4221 and the second recess sections 4223. In an embodiment of the present application, in order to avoid stress concentration at the connecting portions between the first recess section 4221 and the second recess sections 4223 of the first strip-shaped recess 4222, a curved transition can be formed at the connecting portions between the first recess section 4221 and the second recess sections 4223.

In the extension direction of the first strip-shaped recesses 4222, the first spacing J between two adjacent first strip-shaped recesses 4222 in the same row refers to the spacing between the second recess sections 4223 of two adjacent first strip-shaped recesses 4222. Of course, in the actual design, since the second recess sections 4223 have limited length, the spacing between the first recess sections 4221 of two adjacent first strip-shaped recesses 4222 can be regarded as the first spacing J.

In some embodiments, the first strip-shaped recess 4222 includes a transition section 4225 in the middle position of the first strip-shaped recess 4222. A side wall of the first strip-shaped recess 4222 in the transition section 4225 protrudes outwardly, so that the width of the first strip-shaped recess 4222 in the transition section 4225 is larger than that of the first recess section 4221. It can be understood that since the first strip-shaped recesses 4222 in two adjacent rows are arranged in the staggered manner, in the plurality of first sub-bendable zones 4220 on the same side of the bending axis X of the support plate 40, the first symmetrical axes Y of the first strip-shaped recesses 4222 in row M coincides with the first symmetrical axes Y of the first strip-shaped recesses 4222 in row M+2. Thus, the middle position of each first strip-shaped recess 4222 can be surrounded by up to four ends (the second recess sections 4223) of other first strip-shaped recesses 4222, and a certain distance is provided between two adjacent first strip-shaped recesses 4222, thereby forming a relatively large area without recess, which may produce relatively great stress during the bending, which is not conducive to improving the overall bending performance of the support plate 40. In order to reduce the area without recess, the side walls of the first strip-shaped recesses 4222 in the transition section 4225 are protruded outward in curved or spline shape, so that the width of the first strip-shaped recesses 4222 in the transition section 4225 is larger than that of the first recess section 4221, thereby increasing the size of the transition section 4225 and reducing the size of the area without recess, and thus reducing the bending stress in this area during the bending and improving the overall bending performance of the support plate 40.

As an optional embodiment, the projection of the transition section 4225 of each first strip-shaped recess 4222, projected along the thickness direction of the support plate 40, is symmetrical with respect to the first symmetrical axis Y of this first strip-shaped recess 4222. In this way, the stress concentration is further diminished, and the overall bending performance of the support plate 40 is improved.

In an embodiment of the present application, in the plurality of first sub-bendable zones 4220 on the same side of the bending axis X of the support plate 40, along the first direction, the lengths of the first strip-shaped recesses 4222 are decreased in accordance with a first preset pattern. For ease of understanding, the arrangement pattern of the first strip-shaped recesses 4222 will be described in specific embodiments below.

The first sub-bendable zone 4220, where the row of first strip-shaped recesses 4222 corresponding to the bending axis X of the support plate 40 is located, is defined as the 1-st first sub-bendable zone 4220 in the plurality of first sub-bendable zones 4220 on the same side of the bending axis X of the support plate 40, and is the corresponding first sub-bendable zone 4220 when N=1.

In some embodiments, in the plurality of first sub-bendable zones 4220 on the same side of the bending axis X, along the first direction, the length of any first strip-shaped recess 4222 in the N-th first sub-bendable zone 4220 is $L_N$, and the length of any first strip-shaped recess 4222 in the (N+1)-th first sub-bendable zones 4220 is $L_{N+1}$, where N is a positive integer. The first preset pattern is $L_N - L_{N+1} = m$, where m>0. That is, in this embodiment, the length of the first strip-shaped recesses 4222 in the plurality of first sub-bendable zones 4220 decreases by a fixed value m. As an optional embodiment, the fixed value m is ranged from 0.05 mm to 0.5 mm. For example, in the plurality of first sub-bendable zones 4220, the length of the first strip-shaped recesses 4222 decreases by a fixed value of 0.1 mm according to the fixed-reduction pattern.

Figure 10:
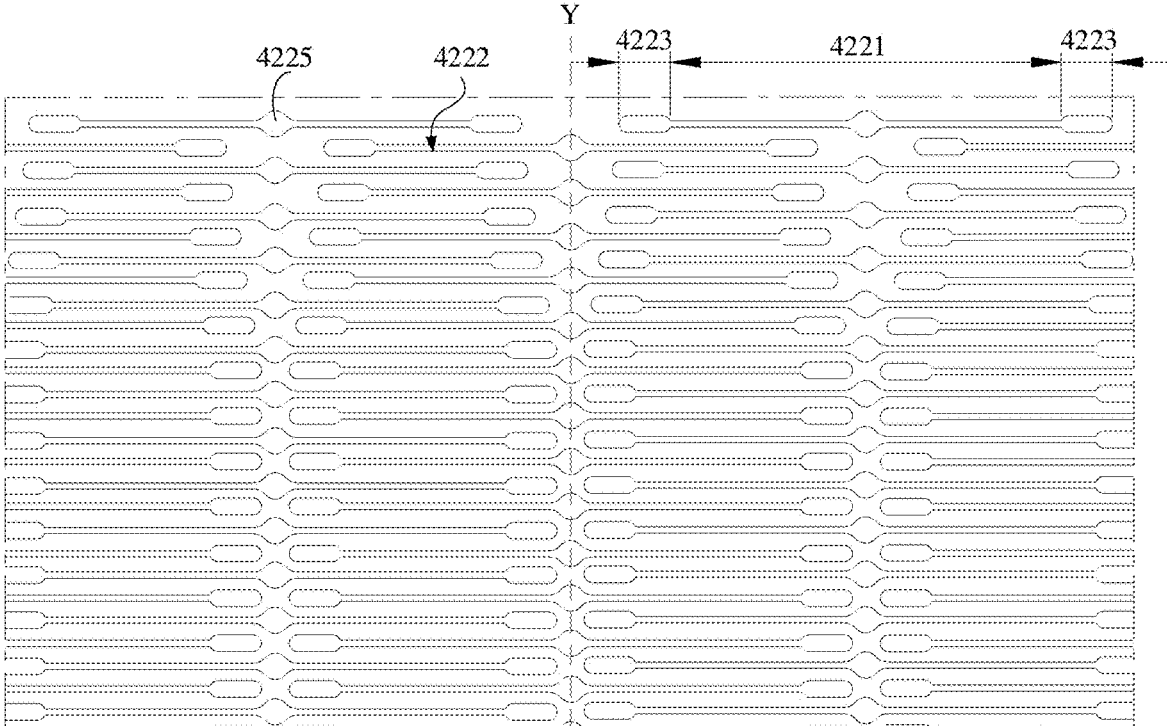
FIG. 10 shows a structural schematic view of a local area of a first bendable zone in an embodiment of the present application.

Specifically, in the embodiment shown in FIG. 10, in the plurality of first sub-bendable zones 4220 on the same side of the bending axis X, the second spacing I between the first strip-shaped recesses 4222 in any two adjacent rows is equal; and in the plurality of first sub-bendable zones 4220, the first symmetrical axes Y of the first strip-shaped recesses 4222 in row M coincide with the first symmetrical axes Y of the first strip-shaped recesses 4222 in row M+2. The 1-st first sub-bendable zone 4220 includes a plurality of rows of first strip-shaped recesses 4222 with a length of $L_1$. From the 2-nd first sub-bendable zone 4220, each sub-bendable zone includes one row of first strip-shaped recesses 4222, and the length of the first strip-shaped recesses 4222 in different first sub-bendable zones 4220 decreases by a fixed value m. In this case, in the plurality of first sub-bendable zones 4220 where the length of the first strip-shaped recesses 4222 decreases by a fixed value m, a straight line can be formed by successively connecting the centers of the edges of the second recess sections 4223 located on the same side of the plurality of first strip-shaped recesses 4222 which are symmetrically arranged with respect to the same first symmetrical axis Y. The straight line has a slope of K=f/m, where f=H+T, H is the width of the first strip-shaped recess 4222 along the first direction, which is a fixed value, and T is the spacing between the first strip-shaped recesses 4222 which are symmetrical with respect to the same first symmetrical axis Y in two adjacent rows.

In some embodiments, in the plurality of first sub-bendable zones 4220 on the same side of the bending axis X, along the first direction, the length of any first strip-shaped recess 4222 in the 1-st first sub-bendable zones 4220 is $L_1$, and the length of any first strip-shaped recess 4222 in the N-th first sub-bendable zone 4220 is $L_N$, where N is a positive integer. The first preset pattern is $L_N = L_1 - (N-1) \times d_1$, where $d_1 > 0$. That is, in this embodiment, the length of the first strip-shaped recesses 4222 in the plurality of first sub-bendable zones 4220 decreases in an arithmetic sequence. In an optional embodiment, $d_1$ is ranged from 0.05 mm to 0.3 mm. For example, in the plurality of first sub-bendable zones 4220, the lengths of the first strip-shaped recesses 4222 are respectively 0.4 mm, 0.3 mm, 0.2 mm, and 0.1 mm, which decrease in an arithmetic sequence.

Figure 11:
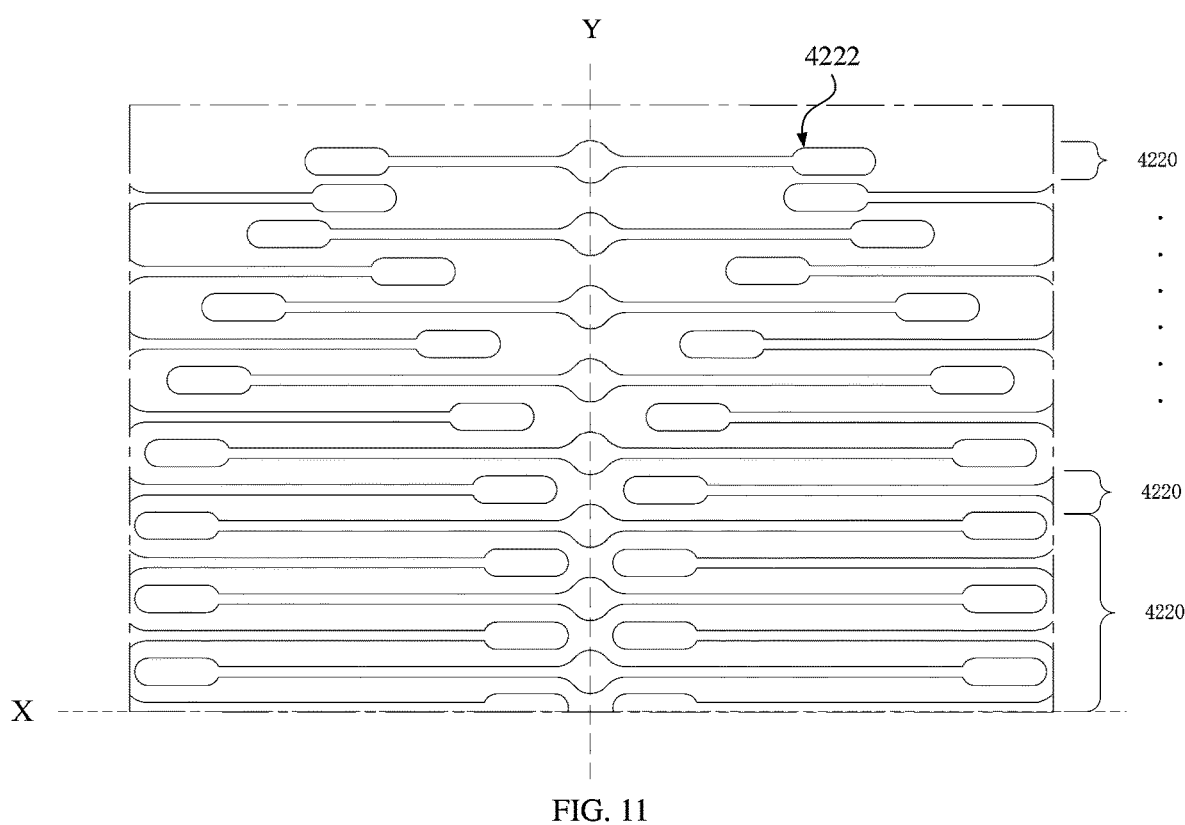
FIG. 11 shows a structural schematic view of a local area of a first bendable zone in another embodiment of the present application.

Specifically, in the embodiment shown in FIG. 11, in the plurality of first sub-bendable zones 4220 on the same side of the bending axis X, the second spacing I between the first strip-shaped recesses 4222 in any two adjacent rows is equal; and in the plurality of first sub-bendable zones 4220, the first symmetrical axes Y of the first strip-shaped recesses 4222 in row M coincide with the first symmetrical axes Y of the first strip-shaped recesses 4222 in row M+2. The 1-st first sub-bendable zone 4220 includes a plurality of rows of first strip-shaped recesses 4222 with a length of $L_1$. From the 2-nd first sub-bendable zone 4220, each sub-bendable zone includes one row of first strip-shaped recesses 4222, and the length of the first strip-shaped recesses 4222 in different first sub-bendable zones 4220 decreases in an arithmetic sequence. In this case, in the plurality of first sub-bendable zones 4220 where the length of the first strip-shaped recesses 4222 decreases in an arithmetic sequence, a plurality of straight lines can be formed by successively connecting the centers of the edges of the second recess sections 4223 located on the same side of the plurality of first strip-shaped recesses 4222 which are symmetrically arranged with respect to the same first symmetrical axis Y. The plurality of straight lines have different slopes. The difference between the reciprocal of the slopes of any two adjacent straight lines is a fixed value Q, and $Q = d_1/f$, where $d_1$ is the common difference of the arithmetic sequence, and f=H+T, where H is the width of the first strip-shaped recess 4222 along the first direction, which is a fixed value, and T is the spacing between the first strip-shaped recesses 4222 which are symmetrical with respect to the same first symmetrical axis Y in two adjacent rows.

In some embodiments, in the plurality of first sub-bendable zones 4220 on the same side of the bending axis X, along the first direction, the length of any first strip-shaped recess 4222 in the 1-st first sub-bendable zones 4220 is $L_1$, and the length of any first strip-shaped recess 4222 in the N-th first sub-bendable zone 4220 is $L_N$, where N is a positive integer. The first preset pattern is $L_N = L_1 + (N-1) \times b_1 + (N-1) \times (N-2) \times d_2/2$, where $d_2 = b_2 - b_1$, $b_1 = L_2 - L_1 < 0$, and $b_2 = L_3 - L_2 < 0$. That is, in this embodiment, the length of the first strip-shaped recesses 4222 in the plurality of first sub-bendable zones 4220 is decreases in a second-order arithmetic sequence. In an optional embodiment, $d_2$ is ranged from 0.05 mm to 0.15 mm. For example, in the plurality of first sub-bendable zones 4220, the lengths of the first strip-shaped recesses 4222 are respectively 0.7 mm, 0.4 mm, 0.2 mm, and 0.1 mm, which decrease in a second-order arithmetic sequence.

Figure 12:
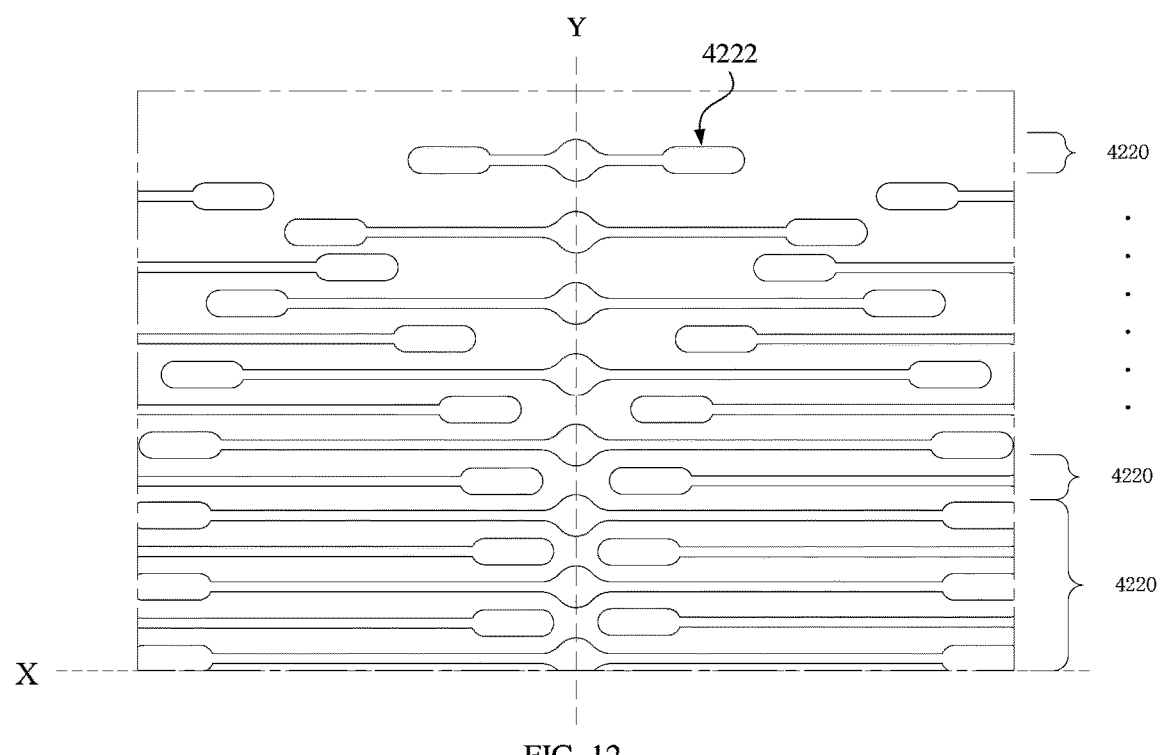
FIG. 12 shows a structural schematic view of a local area of a first bendable zone in yet another embodiment of the present application.

Specifically, in the embodiment shown in FIG. 12, in the plurality of first sub-bendable zones 4220 on the same side of the bending axis X, the second spacing I between the first strip-shaped recesses 4222 in any two adjacent rows is equal; and in the plurality of first sub-bendable zones 4220, the first symmetrical axes Y of the first strip-shaped recesses 4222 in row M coincide with the first symmetrical axes Y of the first strip-shaped recesses 4222 in row M+2. The 1-st first sub-bendable zone 4220 includes a plurality of rows of first strip-shaped recesses 4222 with a length of $L_1$. From the 2-nd first sub-bendable zone 4220, each sub-bendable zone includes one row of first strip-shaped recesses 4222, and the length of the first strip-shaped recesses 4222 in different first sub-bendable zones 4220 decreases in a second-order arithmetic sequence. In this case, in the plurality of first sub-bendable zones 4220 where the length of the first strip-shaped recesses 4222 decreases in a second-order arithmetic sequence, a plurality of straight lines can be formed by successively connecting the centers of the edges of the second recess sections 4223 located on the same side of the plurality of first strip-shaped recesses 4222 which are symmetrically arranged with respect to the same first symmetrical axis Y. The plurality of straight lines have different slopes. The difference between the reciprocal of the slopes of any two adjacent straight lines is varied in an arithmetic sequence, where the common difference of the arithmetic sequence is d 2.

In some embodiments, in the plurality of first sub-bendable zones 4220 on the same side of the bending axis X, along the first direction, the length of any first strip-shaped recess 4222 in the 1-st first sub-bendable zones 4220 is $L_1$, and the length of any first strip-shaped recess 4222 in the N-th first sub-bendable zone 4220 is $L_N$, where N is a positive integer. The first preset pattern is $L_1=L_N\times q^{N-1}$, where q>0, and $L_1$>0. That is, in this embodiment, the length of the first strip-shaped recesses 4222 in the plurality of first sub-bendable zones 4220 decreases in a geometric sequence. In an optional embodiment, 1<q≤2. For example, in the plurality of first sub-bendable zones 4220, the lengths of the first strip-shaped recesses 4222 are respectively 0.8 mm, 0.4 mm, 0.2 mm, and 0.1 mm, which decrease in a geometric sequence.

Figure 13:
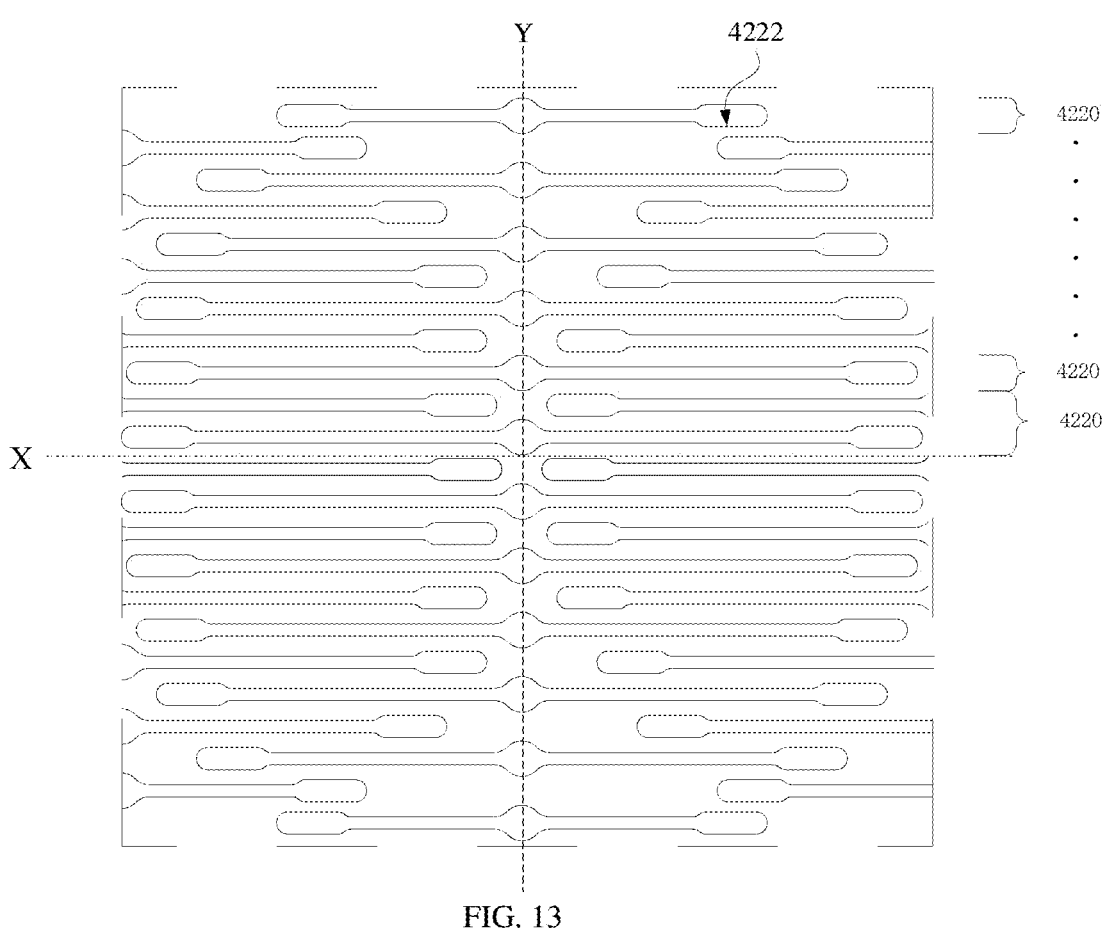
FIG. 13 shows a structural schematic view of a local area of a first bendable zone in yet another embodiment of the present application.

Specifically, in some embodiments shown in FIG. 13, in the plurality of first sub-bendable zones 4220 on the same side of the bending axis X, the second spacing I between the first strip-shaped recesses 4222 in any two adjacent rows is equal; and in the plurality of first sub-bendable zones 4220, the first symmetrical axes Y of the first strip-shaped recesses 4222 in row M coincide with the first symmetrical axes Y of the first strip-shaped recesses 4222 in row M+2. The 1-st first sub-bendable zone 4220 includes a plurality of rows of first strip-shaped recesses 4222 with a length of $L_1$. From the 2-nd first sub-bendable zone 4220, each sub-bendable zone includes one row of first strip-shaped recesses 4222, and the length of the first strip-shaped recesses 4222 in different first sub-bendable zones 4220 decreases in a geometric sequence. In this case, in the plurality of first sub-bendable zones 4220 where the length of the first strip-shaped recesses 4222 decreases in a geometric sequence, a plurality of straight lines can be formed by successively connecting the centers of the edges of the second recess sections 4223 located on the same side of the plurality of first strip-shaped recesses

4222 which are symmetrically arranged with respect to the same first symmetrical axis Y. The plurality of straight lines have different slopes. The ratio of the slopes of any two adjacent straight lines is a fixed value P, and P=q.

It can be seen that by reducing the length of the first strip-shaped recesses 4222 in different first sub-bendable zones 4220 in accordance with the first pattern, the flexural rigidity in different regions of the support plate 40 can be precisely controlled, so that the bendable area 42 has a smooth transition and the overall curvature of the bendable area 42 is more continuous.

In some embodiments, in the second bendable zone 424, the closer a region to the non-bendable area 44, the greater the flexural rigidity of the region. In this way, the flexural rigidity of the second bendable zone 424 is further regional and decreasingly varied. As such, the bending ductility and fatigue resistance of the region corresponding to the support plate 40 are improved, and the difference in curvature radius between bendable areas of the support plate 40 in the folded state is reduced, thereby allowing the bendable area 42 to have a smooth transition and making the overall curvature of the bendable area 42 more continuous. Thus, not only the bending stress concentration of the support plate 40 is mitigated, reducing the risk of fracture or failure of the support plate 40, the stress exerted by the support plate 40 on the flexible display panel also diminishes, protecting the flexible display panel from the risk of film debonding or cracking.

Further, as shown in FIG. 4 and FIGS. 14 to 17, the second bendable zone 424 includes a plurality of rows of second strip-shaped recesses 4242 arranged at intervals along the first direction. The extension direction of the second strip-shaped recesses 4242 is parallel to the bending axis X of the support plate 40. Along the first direction, the length of the second strip-shaped recesses 4242 is decreased in accordance with a second preset pattern. The pattern for the length variation of the second strip-shaped recesses 4242 is the same as that of the first strip-shaped recesses 4222 in some embodiments mentioned above.

Figure 14:
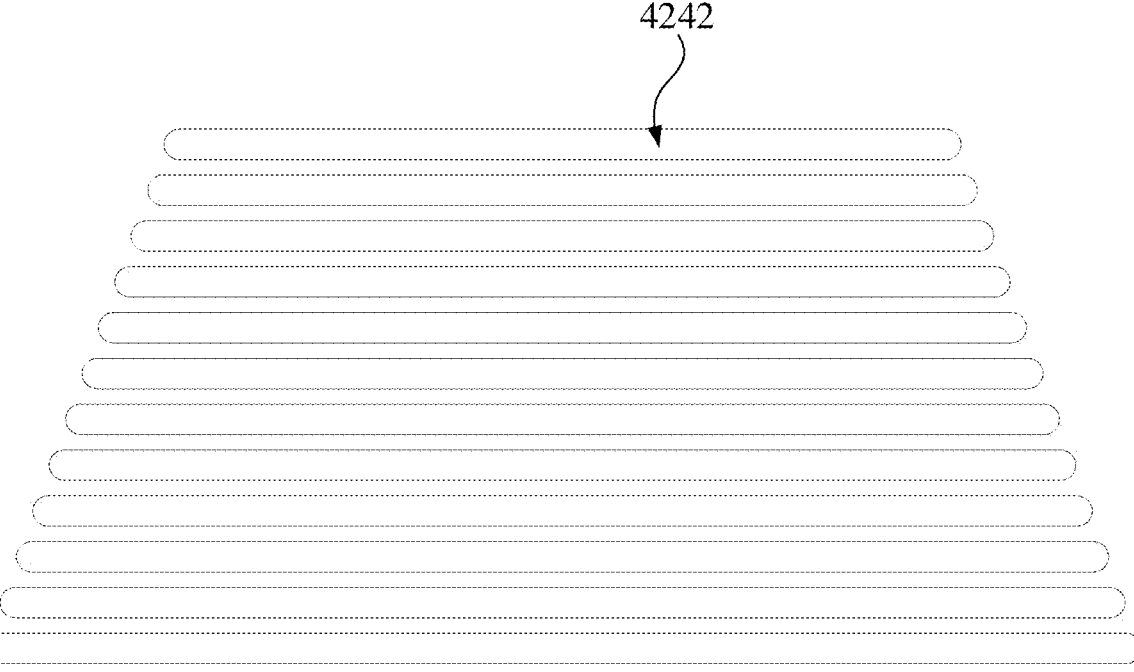
FIG. 14 shows a schematic view of an arrangement of second strip-shaped recesses in a second bendable zone in an embodiment of the present application.
Figure 15:
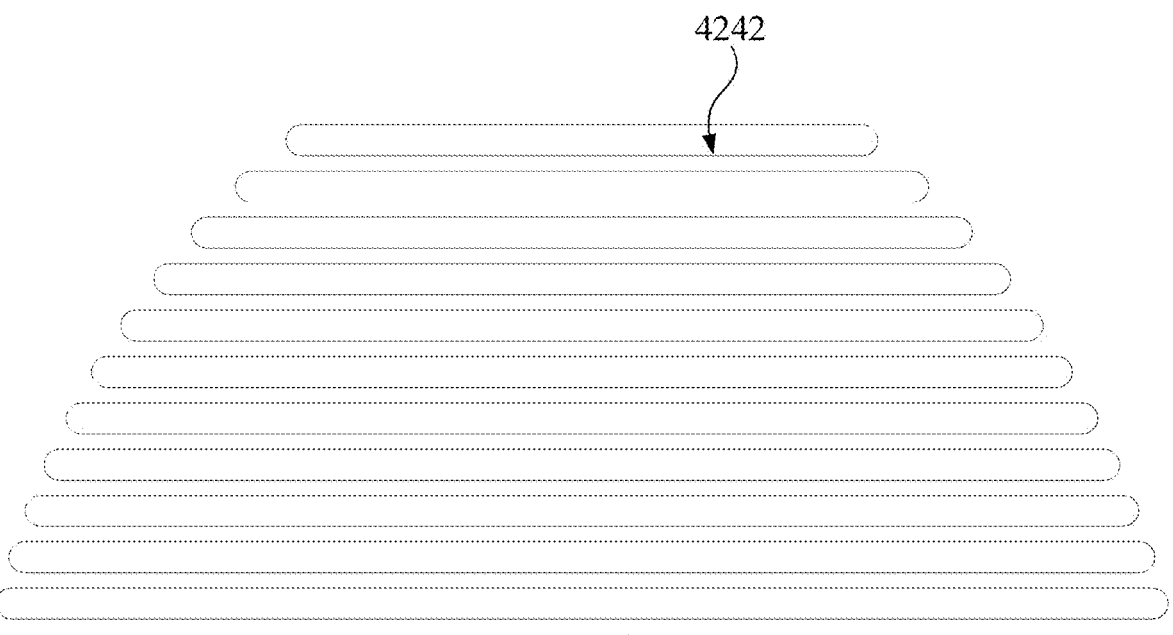
FIG. 15 shows a schematic view of an arrangement of second strip-shaped recesses in a second bendable zone in another embodiment of the present application.
Figure 16:
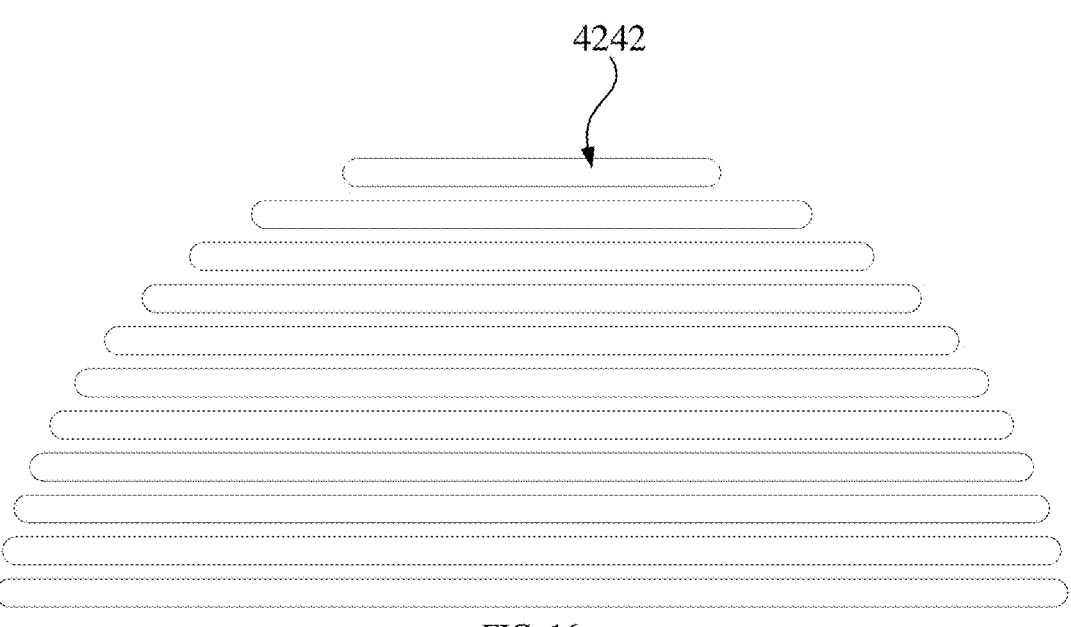
FIG. 16 shows a schematic view of an arrangement of second strip-shaped recesses in a second bendable zone in yet another embodiment of the present application.
Figure 17:
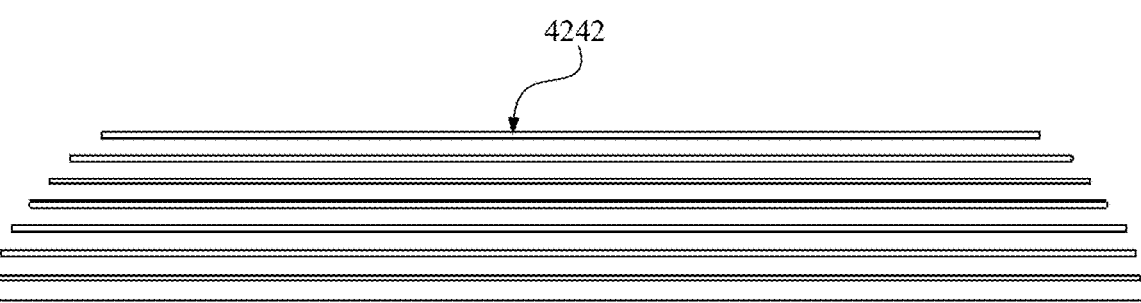
FIG. 17 shows a schematic view of an arrangement of second strip-shaped recesses in a second bendable zone in yet another embodiment of the present application.

For ease of description, the relevant pattern for variation can be referred to the patterns for the length variation of the first strip-shaped recesses 4222 mentioned above. For example, in some embodiments, as shown in FIG. 14, the length of the plurality of rows of second strip-shaped recesses 4242 can decrease by a fixed value. In other embodiments, as shown in FIG. 15, the length of the plurality of rows of second strip-shaped recesses 4242 can be decrease in an arithmetic sequence. In yet other embodiments, as shown in FIG. 16, the length of the plurality of rows of second strip-shaped recesses 4242 can decrease in a second-order arithmetic sequence. In some further embodiments, as shown in FIG. 17, the length of the plurality of rows of the second strip-shaped recesses 4242 can be decrease in a geometric sequence.

Figure 18:
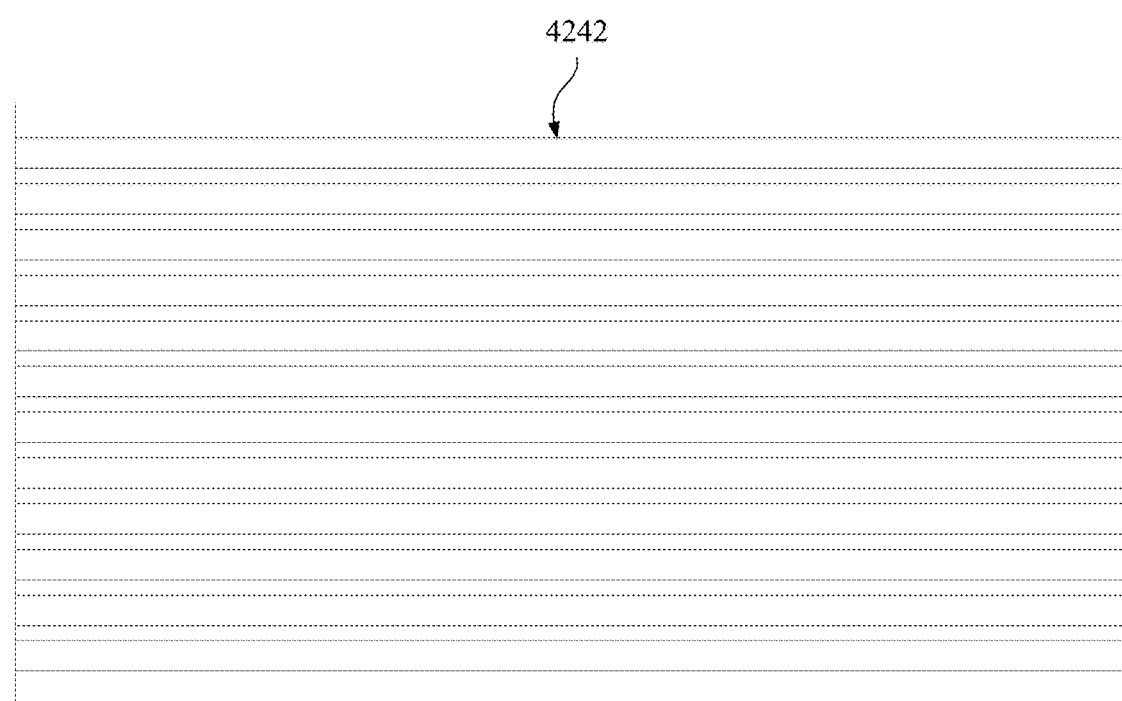
FIG. 18 shows a schematic view of an arrangement of second strip-shaped recesses in a second bendable zone in yet another embodiment of the present application.

Of course, for the purpose of keeping the flexural rigidity of the second bendable zones 424 even and uniform, the arrangement pattern of the second strip-shaped recesses 4242 can be different from that of the first strip-shaped recesses 4222. For example, in some embodiments, as shown in FIG. 18, the second bendable zones 424 includes a plurality of rows of second strip-shaped recesses 4242 arranged at intervals along the first direction, the extension direction of the second strip-shaped recesses 4242 is parallel to the bending axis X of the support plate 40, and each of the second strip-shaped recesses 4242 run through the third side and the fourth side of the support plate 40.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

What is claimed is:

1. A support plate, comprising at least one bendable area and at least one non-bendable area connected to the bendable area;

wherein the bendable area comprises a first bendable zone and a second bendable zone, the second bendable zone is located between the first bendable zone and the at least one non-bendable area;

the first bendable zone comprises a first etching pattern, and the second bendable zone comprises a second etching pattern, such that the flexural rigidity of the second bendable zone is greater than the flexural rigidity of the first bendable zone, and is less than the flexural rigidity of the non-bendable area; and the first etching pattern comprises a plurality of first strip-shaped recesses, and the second etching pattern comprises a plurality of second strip-shaped recesses;

wherein the at least one non-bendable area comprises two non-bendable zones, the at least one bendable area is connected between the two non-bendable zones, and a bending axis of the support plate is located in the first bendable zone;

taking the bending axis of the support plate as a reference, the first bendable zone comprises a plurality of first sub-bendable zones continuously arranged along a first direction and located on the same side of the bending axis of the support plate, and each of the first sub-bendable zones comprises at least one row of the first strip-shaped recesses extending along a second direction;

wherein the first strip-shaped recesses in two adjacent rows are staggered with each other along the first direction;

a projection of each of the first strip-shaped recesses, projected along a thickness direction of the support plate, has a first symmetrical axis along the first direction; and in the plurality of first sub-bendable zones on the same side of the bending axis of the support plate, the first symmetrical axes of the first strip-shaped recesses in row M coincide with the first symmetrical axes of the first strip-shaped recesses in row M+2, where M is a positive integer;

wherein the first strip-shaped recess in the extension direction comprises a first recess section and second recess sections, the second recess sections are located at two ends of the first recess section; and each of the first recess section and the second recess sections is an equal-width structure, and the width of the second recess sections is larger than the width of the first recess section.

2. The support plate of claim 1, wherein in the first bendable zone, the closer a region to the second bendable zone, the greater the flexural rigidity of the region; and the depth of the first strip-shaped recesses is greater than the depth of the second strip-shaped recesses.

3. The support plate of claim 2, wherein all of the first strip-shaped recesses in each of the first sub-bendable zones are equal in length; and in the plurality of first sub-bendable zones located on the same side of the bending axis of the support plate, the closer the first sub-bendable zone to the second bendable zone, the less the length of the first strip-shaped recesses in the first sub-bendable zone;

wherein the first direction is a direction from the first bendable zone to the second bendable zone, and the second direction is parallel to the bending axis of the support plate and perpendicular to the first direction.

4. The support plate of claim 3, wherein the first bendable zone is an axisymmetric structure with the bending axis of the support plate as a symmetrical axis.

5. The support plate of claim 3, wherein a projection of each row of the first strip-shaped recesses, projected along the thickness direction of the support plate, has a symmetrical axis along the second direction; and a projection of the bending axis of the support plate, projected along the thickness direction of the support plate, coincides with the symmetrical axis along the second direction of the projection of one row of the first strip-shaped recesses, projected along the thickness direction of the support plate.

6. The support plate of claim 5, wherein the row of the first strip-shaped recesses corresponding to the bending axis of the support plate is located in one first sub-bendable zone, and the first strip-shaped recesses of the first sub-bendable zone have the largest length.

7. The support plate of claim 3, wherein in the plurality of first sub-bendable zones on the same side of the bending axis of the support plate, along the first direction, the lengths of the first strip-shaped recesses are decreased in accordance with a first preset pattern.

8. The support plate of claim 7, wherein in the plurality of first sub-bendable zones on the same side of the bending axis of the support plate, along the first direction, the length of any one of the first strip-shaped recesses in the N-th first sub-bendable zone is $L_N$, and the length of any one of the first strip-shaped recesses in the (N+1)-th first sub-bendable zone is $L_{N+1}$, where N is a positive integer; and the first preset pattern is $L_N-L_{N+1}=m$, where m>0 and m is a constant.

9. The support plate of claim 7, wherein in the plurality of first sub-bendable zones on the same side of the bending axis of the support plate, along the first direction, the length of the first strip-shaped recesses in the 1-st first sub-bendable zones is $L_1$, and the length of the of the first strip-shaped recesses in the N-th first sub-bendable zone is $L_N$, where N is a positive integer; and the first preset pattern is:

$L_N=L_1-(N-1)\times d_1$, where $d_1>0$; or $L_N=L_1+(N-1)\times b_1+(N-1)\times(N-2)\times d_2/2$, where $d_2=b_2-b_1$, $b_1=L_2-L_1<0$, and $b_2=L_3-L_2<0$; or $L_1=L_N\times q^{N-1}$, where q>0, and $L_1>0$.

10. The support plate of claim 1, wherein the first recess section is provided with a transition section in a middle position thereof, and a side wall of the first strip-shaped recess in the transition section protrudes outwardly, such that the width of the first strip-shaped recess in the transition section is larger than the width of the first recess section; and a projection of a side wall of the transition section of any one of the first strip-shaped recesses, projected along the thickness direction of the support plate, is symmetrical with respect to the first symmetrical axis of the first strip-shaped recess.

11. The support plate of claim 7, wherein in the same first sub-bendable zone, an equal first spacing is defined between two adjacent first strip-shaped recesses in a row; and in the plurality of first sub-bendable zones on the same side of the bending axis of the support plate, the first spacing is gradually increased along the first direction.

12. The support plate of claim 11, wherein the support plate comprises a third side and a fourth side, the third side and the fourth side are perpendicular to the bending axis of the support plate, at least some of the plurality of the first sub-bendable zones on the same side of the bending axis of the support plate comprise a marginal strip-shaped recess, and each of the marginal strip-shaped recesses is arranged in a row with corresponding first strip-shaped recesses, having one end running through the third side or the fourth side; and a spacing between the marginal strip-shaped recess and one adjacent first strip-shaped recess in the same row is equal to the first spacing between two adjacent first strip-shaped recesses in the same row.

13. The support plate of claim 7, wherein along the first direction, all of the first strip-shaped recesses are equal in width, and/or a second spacing between the first strip-shaped recesses in two adjacent rows is equal.

14. The support plate of claim 3, wherein in the second bendable zone, the closer a region to the non-bendable area, the greater the flexural rigidity of the region.

15. The support plate of claim 14, wherein the second bendable zone comprises a plurality of second sub-bendable zones continuously arranged along the first direction, each of the second sub-bendable zones comprises at least one row of second strip-shaped recesses extending along the second direction, and all of the second strip-shaped recesses in each of the second sub-bendable zones are equal in length;

the closer the second sub-bendable zone to the non-bendable area, the less the length of the second strip-shaped recesses in the second sub-bendable zone; and in the plurality of second sub-bendable zones, along the first direction, the lengths of the second strip-shaped recesses are decreased in accordance with a second preset pattern.

16. The support plate of claim 3, wherein the second bendable zone comprises a plurality of second sub-bendable zones continuously arranged along the first direction, each of the second sub-bendable zones comprises a second strip-shaped recess extending along the second direction, the support plate comprises a third side and a fourth side, the third side and the fourth side are perpendicular to the bending axis of the support plate, and the second strip-shaped recess run through the third side and the fourth side.

17. A foldable display module, comprising a flexible display panel and the support plate of claim 1;

the support plate comprises a first side and a second side opposite to each other, the first etching pattern and the second etching pattern are disposed on the second side, and the flexible display panel is disposed on the first side.

* * * * *